US012499645B2

United States Patent
Kim et al.

(10) Patent No.: US 12,499,645 B2
(45) Date of Patent: Dec. 16, 2025

(54) ELECTRONIC DEVICE FOR DISPLAYING VISUAL OBJECT BASED ON LOCATION OF EXTERNAL ELECTRONIC DEVICE AND METHOD THEREOF

(71) Applicant: SAMSUNG ELECTRONICS CO., LTD., Suwon-si (KR)

(72) Inventors: Sungoh Kim, Suwon-si (KR); Kihwan Kim, Suwon-si (KR); Harksang Kim, Suwon-si (KR); Donghyun Yeom, Suwon-si (KR); Hyuntaek Woo, Suwon-si (KR); Sanghun Lee, Suwon-si (KR); Jungjik Lee, Suwon-si (KR); Sungsoo Choi, Suwon-si (KR); Daehee Kim, Suwon-si (KR); Beomsu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 18/458,522

(22) Filed: Aug. 30, 2023

(65) Prior Publication Data

US 2024/0193889 A1 Jun. 13, 2024

Related U.S. Application Data

(63) Continuation of application No. PCT/KR2023/012691, filed on Aug. 25, 2023.

(30) Foreign Application Priority Data

Dec. 9, 2022 (KR) .................. 10-2022-0171645
Dec. 30, 2022 (KR) .................. 10-2022-0191216

(51) Int. Cl.
*G06T 19/20* (2011.01)
*G06T 7/73* (2017.01)
(Continued)

(52) U.S. Cl.
CPC .............. *G06T 19/20* (2013.01); *G06T 7/73* (2017.01); *G06T 19/006* (2013.01); *G06V 20/20* (2022.01);
(Continued)

(58) Field of Classification Search
None
See application file for complete search history.

(56) References Cited

U.S. PATENT DOCUMENTS 10,083,544 B2    9/2018    Chen et al.
10,334,076 B2 *   6/2019    Mckenzie ............... G06F 3/011
(Continued)

FOREIGN PATENT DOCUMENTS

JP         2017107293 A      6/2017
KR    10-2017-0130580      11/2017
(Continued)

OTHER PUBLICATIONS

Search Report and Written Opinion dated Dec. 5, 2023 issued in International Patent Application No. PCT/KR2023/012691.

*Primary Examiner* — Ryan M Gray
(74) *Attorney, Agent, or Firm* — Nixon & Vanderhye P.C.

(57) ABSTRACT

According to an embodiment, a processor of a wearable device is configured to identify, based on an image output from a camera, an external electronic device. The processor, based on the identification, is configured to request outputting of an optical signal to the external electronic device through a communication circuit. The processor is configured to identify, in a portion of the image where the external electronic device is displayed, a position of the optical signal output from the external electronic device. The processor is configured to control a display to display a visual object having an extended shape based on the identified position in the display.

20 Claims, 15 Drawing Sheets

(51) Int. Cl.
  *G06T 19/00* (2011.01)
  *G06V 20/20* (2022.01)
  *G06V 40/20* (2022.01)
  *H04B 10/114* (2013.01)
  *H04N 7/22* (2006.01)
(52) U.S. Cl.
  CPC ......... *G06V 40/20* (2022.01); *H04B 10/1149* (2013.01); *H04N 7/22* (2013.01); *G06T 2207/30244* (2013.01); *G06T 2219/2021* (2013.01)

(56) References Cited

U.S. PATENT DOCUMENTS

| | | |
|---|---|---|
| 10,444,865 B2 | 10/2019 | Kirmani et al. |
| 10,948,992 B1 | 3/2021 | Bai |
| 11,697,068 B2 * | 7/2023 | Bar-Zeev ............... A63F 13/428 463/31 |
| 2017/0011553 A1 * | 1/2017 | Chen ................... G02B 27/0172 |
| 2018/0232066 A1 * | 8/2018 | Jeon ........................ G06F 3/011 |
| 2018/0314346 A1 * | 11/2018 | Kirmani ................ G06F 3/0346 |
| 2019/0385372 A1 * | 12/2019 | Cartwright ............ G06T 19/003 |
| 2020/0366897 A1 | 11/2020 | Trepte |
| 2022/0244899 A1 * | 8/2022 | Yasuda ................. G06T 19/006 |
| 2022/0308658 A1 | 9/2022 | Hashimoto |
| 2023/0305788 A1 * | 9/2023 | Kulshrestha ........... G06V 20/20 |
| 2023/0398433 A1 * | 12/2023 | Ye ......................... A63F 13/428 |

FOREIGN PATENT DOCUMENTS

| | | |
|---|---|---|
| KR | 20180122797 A | 11/2018 |
| KR | 20190021747 A | 3/2019 |
| KR | 10-2019-0136057 | 12/2019 |
| KR | 102215112 B1 | 2/2021 |
| KR | 10-2021-0102210 | 8/2021 |
| KR | 10-2353669 | 1/2022 |

* cited by examiner

ELECTRONIC DEVICE FOR DISPLAYING VISUAL OBJECT BASED ON LOCATION OF EXTERNAL ELECTRONIC DEVICE AND METHOD THEREOF

CROSS-REFERENCE TO RELATED APPLICATIONS

This application is a continuation of International Application No. PCT/KR2023/012691 designating the United States, filed on Aug. 25, 2023, in the Korean Intellectual Property Receiving Office and claiming priority to Korean Patent Application Nos. 10-2022-0171645, filed on Dec. 9, 2022, and 10-2022-0191216, filed on Dec. 30, 2022, in the Korean Intellectual Property Office, the disclosures of each of which are incorporated by reference herein in their entireties.

BACKGROUND

Field

The present disclosure relates to an electronic device for displaying a visual object based on a location of an external electronic device and a method thereof.

Description of Related Art

In order to provide an enhanced user experience, an electronic device that provides an augmented reality (AR) service that displays information generated by a computer in association with an external object in the real-world are being developed. The electronic device may be a wearable device that may be worn by a user. For example, the electronic device may be AR glasses and/or a head-mounted device (HMD).

SUMMARY

According to an example embodiment, a wearable device may comprise: a camera, a communication circuit, a display, and a processor. The processor may be configured to identify, based on an image output from the camera, an external electronic device. The processor, based on the identification, may be configured to request outputting of an optical signal to the external electronic device through the communication circuit. The processor may be configured to identify, in a portion of the image where the external electronic device is displayed, a position of the optical signal output from the external electronic device. The processor may be configured to control the display to display a visual object having an extended shape based on the identified position in the display.

According to an example embodiment, a method of a wearable device, may comprise identifying, based on an image output from a camera, an external electronic device. The method may comprise, based on the identification, requesting outputting of an optical signal to the external electronic device through the communication circuit. The method may comprise identifying, in a portion of the image where the external electronic device is displayed, a position of the optical signal output from the external electronic device. The method may comprise displaying a visual object having an extended shape based on the identified position in the display.

According to an example embodiment, a non-transitory computer readable storage medium may store one or more programs, wherein the one or more programs, when executed by a processor of a wearable device, may cause the wearable device to identify, based on an image output from the camera, an external electronic device. The one or more programs, when executed by the processor of the wearable device, may cause the wearable device based on the identification, to request outputting of an optical signal to the external electronic device through the communication circuit. The one or more programs, when executed by the processor of the wearable device, may cause the wearable device to identify, in a portion of the image where the external electronic device is displayed, a position of the optical signal output from the external electronic device. The one or more programs, when executed by the processor of the wearable device, may cause the wearable device to display a visual object having an extended shape based on the identified position in the display.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
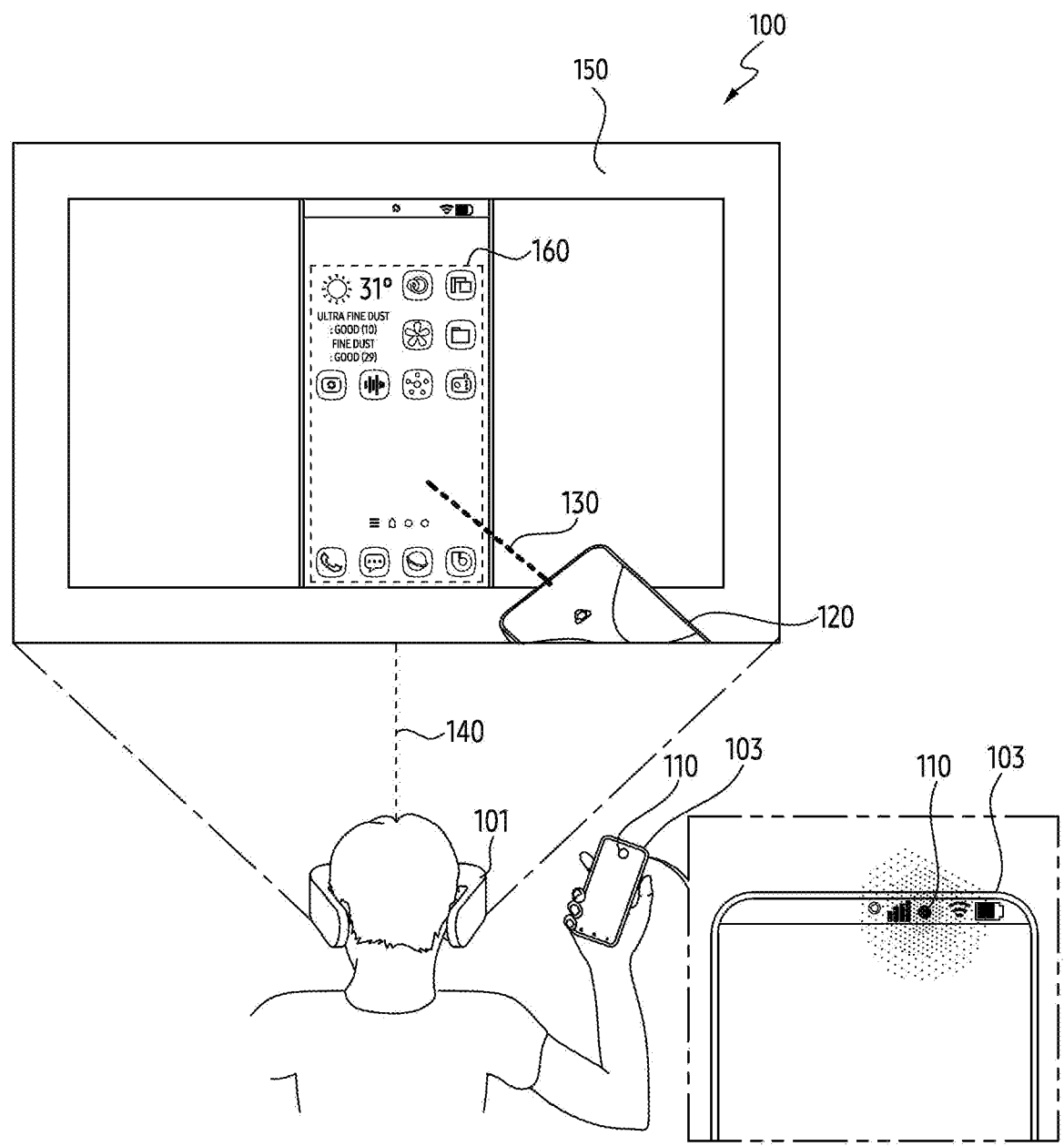
FIG. 1A is a diagram illustrating an example of a screen of a wearable device in which an external electronic device is identified, according to an embodiment.

Hereinafter, various example embodiments of the present disclosure will be described with reference to the accompanying drawings.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 1B:
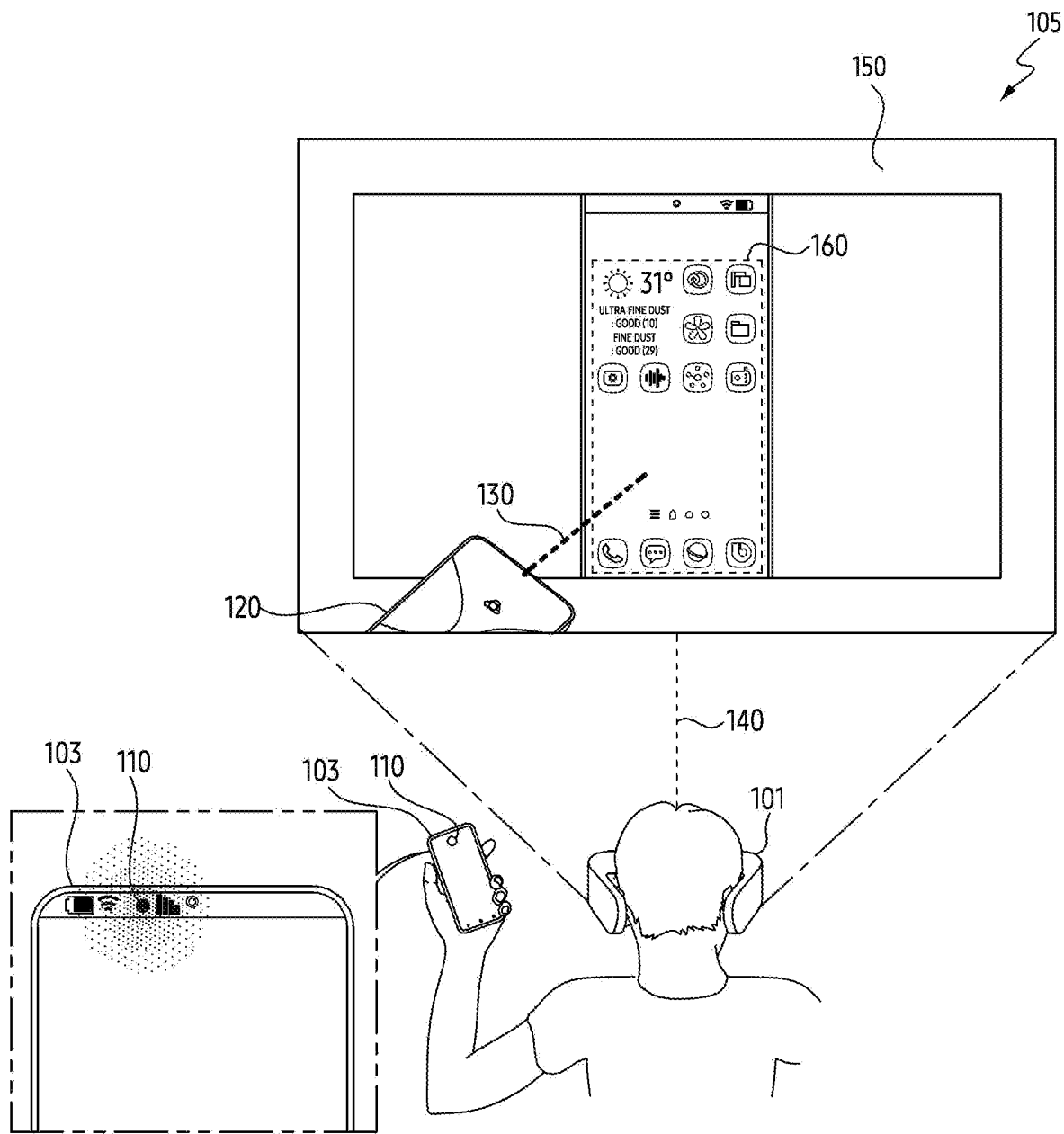
FIG. 1B is a diagram illustrating an example of a screen of a wearable device in which an external electronic device is identified, according to an embodiment.

FIG. 1A is a diagram illustrating an example of a screen of a wearable device in which an external electronic device is identified, according to an embodiment. FIG. 1B is a diagram illustrating an example of a screen of a wearable device in which an external electronic device is identified, according to an embodiment. Referring to FIGS. 1A to 1B, according to an embodiment, a wearable device 101 may include a head-mounted display (HMD) that is wearable on a user's head. Although the appearance of the wearable device 101 having a shape of glasses is illustrated, an embodiment is not limited thereto. An example of a structure of the wearable device 101 that is wearable on the user's head will be described in greater detail with reference to FIGS. 3A, 3B, 4A and/or 4B. One or more hardware included in the wearable device 101 will be described with reference to FIG. 2. An external electronic device 103 of FIGS. 1A to 1B may include a terminal of the user. For example, the terminal may include, without limitation, smart accessories such as a smartphone, a smartpad, a tablet personal computer (PC), a smartwatch, or the like.

According to an embodiment, the wearable device 101 may execute a function associated with augmented reality (AR) and/or mixed reality (MR). Referring to FIGS. 1A and 1B, in a state in which the user wears the wearable device 101, the wearable device 101 may include at least one lens disposed adjacent to the user's eyes. The wearable device 101 may combine light emitted from the display of the wearable device 101 to ambient light passing through the lens. A display area of the display may be formed in the lens through which the ambient light passes. Since the wearable device 101 combines the ambient light and the light emitted from the display, the user may see a mixed image of a real object recognized by the ambient light and a virtual object formed by the light emitted from the display.

According to an embodiment, the wearable device 101 may execute a function associated with video see-through (VST) and/or virtual reality (VR). Referring to FIG. 1, in the state in which the user wears the wearable device 101, the wearable device 101 may include a housing covering the user's eyes. The wearable device 101 may include the display disposed on a first surface facing the eyes in the state. The wearable device 101 may include a camera disposed on a second surface opposite to the first surface. Using the camera, the wearable device 101 may obtain frames including the ambient light. The wearable device 101 may make the user recognize the ambient light through the display, by outputting the frames in the display disposed on the first surface. The display area of the display disposed on the first surface may be formed by one or more pixels included in the display.

Referring to FIGS. 1A and 1B, according to an embodiment, the wearable device 101 may identify the external electronic device 103 based on the image output from the camera. The wearable device 101 may identify the optical signal 110 output from the external electronic device 103, in a portion of the image on which the external electronic device 103 is displayed. For example, the portion of the image may be one area including the external electronic device 103. For example, the one area may be a area formed in a polygonal shape including the external electronic device 103. For example, the optical signal 110 may include an optical signal in a preset (e.g., specified) wavelength band. For example, the preset wavelength band may be a band of about 780 nm or more. For example, the optical signal 110 in the preset wavelength band may be an optical signal of an infrared light wavelength band. According to an embodiment, the wearable device 101 may identify a light source of the optical signal 110. For example, the light source of the optical signal 110 may include a light source that emits light during operation of a proximity sensor included in the external electronic device 103. For example, the light source of the optical signal 110 may include a flash of the external electronic device 103. According to an embodiment, the wearable device 101 may display a first visual object 120 matching the external electronic device 103, based on identifying the optical signal 110 output from the external electronic device 103. For example, the first visual object 120 may include a visual object in which the external electronic device 103 is rendered. For example, the first visual object 120 may be displayed in a different shape from the external electronic device 103. For example, the different shape may be a shape representing a controller. For example, the wearable device 101 may display a second visual object 130 having an extended shape from the first visual object 120. For example, the second visual object 130 may include a visual object for selecting visual objects displayed in a screen 150. For example, the second visual object 130 may be displayed as a beam having a shape of a straight line and/or a curve. For example, the second visual object 130 may be displayed for indicating one of the visual objects 160, as a visual object for input for one of the visual objects 160 displayed in the screen 150. The first visual object 120 and/or the second visual object 130 are not limited to those described above.

Referring to FIG. 1A, in a first example 100, according to an embodiment, the wearable device 101 may identify the external electronic device 103 in a right area of a center line 140 of the wearable device 101, in the image output from the camera. The wearable device 101 may identify the optical signal 110 emitted from the external electronic device 103, in the portion of the image. The optical signal 110 may include light of a wavelength of a visible light band. For example, the wavelength of the visible light band may, for example, be about 380 nm to about 780 nm. For example, the optical signal 110 may include light of a wavelength of an infrared light band. For example, the wavelength of the infrared light band may be a wavelength of about 780 nm or more. The wearable device 101 may identify a position of the optical signal 110, based on the RGB value of the optical signal 110 identified in the image. For example, even if the wavelength of the optical signal 110 is different, the wearable device 101 may detect the position of the optical signal 110 in response to the RGB value of the optical signal 110. For example, the wearable device 101 may identify the position of the optical signal 110, based on identifying the optical signal 110 of a preset RGB value in the image. The wearable device 101 may identify the position of the optical signal 110. For example, the wearable device 101 may identify the optical signal 110 output from the external electronic device 103 positioned in the right side of the center line 140. The wearable device 101 may display the first visual object 120 on a portion mapped to the position of the external electronic device 103, based on identifying the optical signal 110 of the external electronic device 103 positioned in the right area of the center line 140. The wearable device 101 may display the second visual object 130 extended from the first visual object 120.

Referring to FIG. 1B, in a second example 105, according to an embodiment, the wearable device 101 may identify the external electronic device 103, based on the image output from the camera. The wearable device 101 may identify a portion including the external electronic device 103 in the image, based on identifying the external electronic device 103. The wearable device 101 may identify the optical signal 110 emitted from the external electronic device 103, in the portion of the image. The wearable device 101 may identify a portion of the optical signal 110. In the second example 105, the wearable device 101 may identify the position of the external electronic device 103 positioned in a left area of the center line 140 and/or the optical signal 110 emitted from the external electronic device 103. The wearable device 101 may display the first visual object 120 mapped to the position in the screen 150, based on identifying the position of the optical signal 110. The wearable device 101 may display the second visual object 130 having a shape extended from the first visual object 120. The wearable device 101 may identify an input for visual objects displayed in the screen 150, based on the second visual object 130.

Referring to FIGS. 1A and 1B, according to an embodiment, the wearable device 101 may identify the movement of the external electronic device 103. The wearable device 101 may identify the movement of the external electronic device 103, based on data obtained using a sensor (e.g., a gyro sensor or an acceleration sensor) included in the external electronic device 103. For example, the wearable device 101 may receive the data obtained based on the sensor included in external electronic device 103. The wearable device 101 may control the first visual object 120 and/or the second visual object 130, based on the movement of the external electronic device 103 identified based on the data. For example, the wearable device 101 may display the first visual object 120 and/or the second visual object 130 matching the movement of the external electronic device 103. In FIGS. 1A and 1B, examples of the external electronic device 103 positioned in the right area and the left area of the wearable device 101 are illustrated, but the disclosure is not limited thereto.

As described above, according to an embodiment, the wearable device 101 may display the first visual object 120 in a portion of the screen 150 corresponding to the position, based on the position of the external electronic device 103 and/or the optical signal 110 output from the external electronic device 103, in the image output from the camera. The wearable device 101 may display the second visual object 130 having the shape extended from the first visual object 120, based on displaying the first visual object 120 on the mapped portion. The wearable device 101 may enhance the user experience of the wearable device 101, by displaying the first visual object 120 on the mapped portion and displaying the second visual object 130 having the shape extended from the first visual object 120.

Hereinafter, with reference to FIG. 2, according to an embodiment, at least one hardware included in wearable device 101 and one or more programs executed by wearable device 101 will be described in greater detail.

Figure 2:
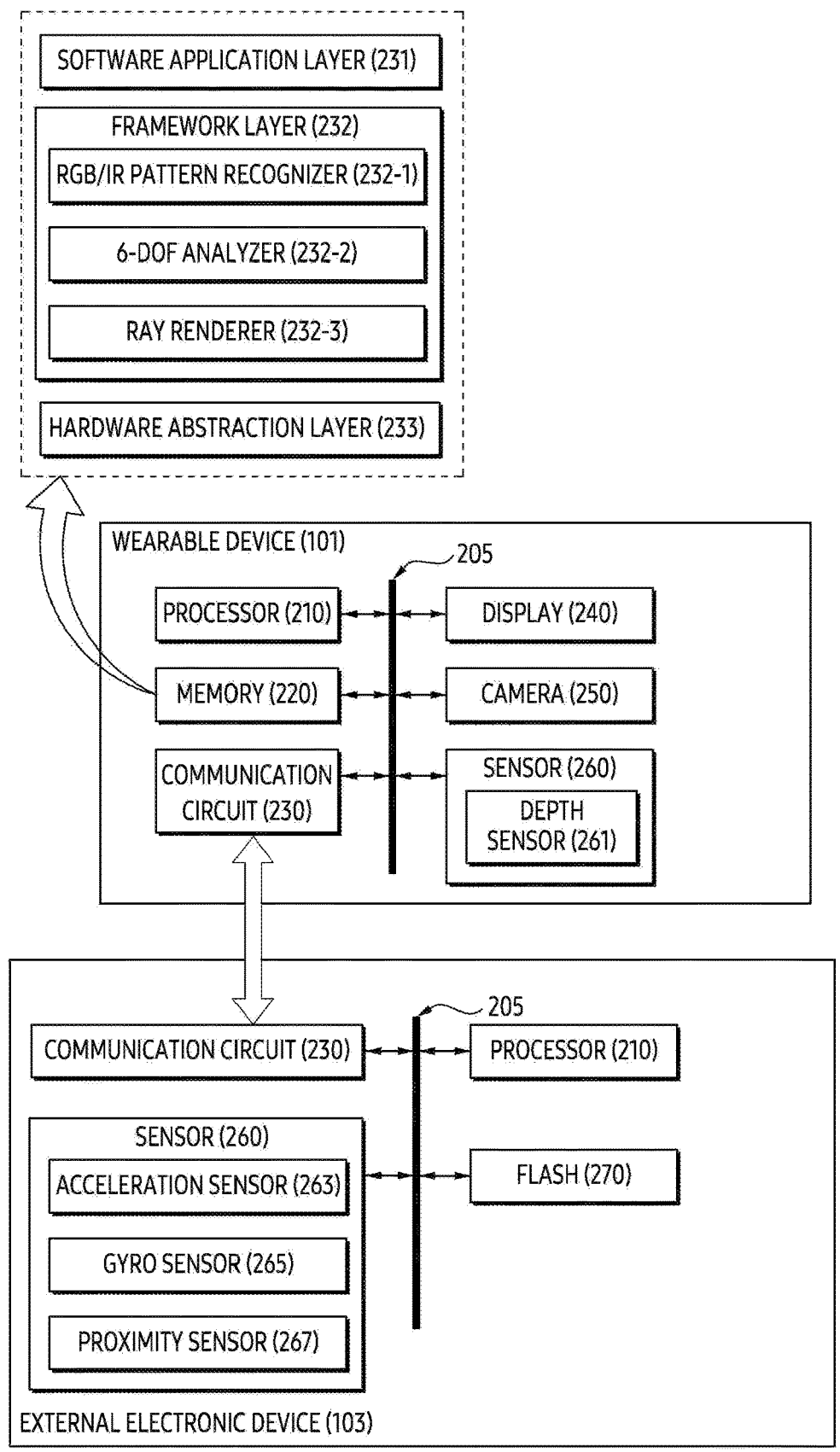
FIG. 2 is a block diagram illustrating an example configuration of a wearable device according to an embodiment.

FIG. 2 is a block diagram illustrating an example configuration of a wearable device according to an embodiment. A wearable device 101 of FIG. 2 may include the wearable device 101 of FIG. 1. An external electronic device 103 of FIG. 2 may include the external electronic device 103 of FIG. 1.

Referring to FIG. 2, according to an embodiment, the wearable device 101 may include at least one of a processor (e.g., including processing circuitry) 210, a memory 220, a communication circuit 230, a display 240, a camera 250, or a sensor 260. The processor 210, the memory 220, the communication circuit 230, the display 240, the camera 250 and the sensor 260 may be electronically and/or operably coupled with each other by an electronical component such as a communication bus 205. Hereinafter, that the hardware operably coupled with each other may refer, for example, to a direct connection or an indirect connection between hardware being established by wire or wirelessly so that the second hardware is controlled by the first hardware among the hardware. Although illustrated in different blocks, embodiments are not limited thereto. A portion (e.g., at least a portion of the processor 210, the communication circuit 230, and the memory 220) of the hardware of FIG. 2 may be included in a single integrated circuit, such as a system on a chip (SoC). The type and/or number of hardware included in the wearable device 101 is not limited to that illustrated in FIG. 2. For example, the wearable device 101 may include only a portion of the hardware illustrated in FIG. 2.

According to an embodiment, the wearable device 101 may include hardware for processing data based on one or more instructions. For example, the hardware for processing data may include the processor 210. The hardware for processing data may include, for example, and without limitation, an arithmetic and logic unit (ALU), a floating point unit (FPU), a field programmable gate array (FPGA), a central processing unit (CPU), and/or an application processor (AP), or the like. For example, the processor 210 may have a structure of a single-core processor, or may have a structure of a multi-core processor such as a dual core, a quad core, a hexa core, or an octa core. The operations of FIG. 1 and/or the operations to be described later may be performed by the processor 210.

According to an embodiment, the memory 220 of the wearable device 101 may include the component for storing data and/or instructions inputted and/or output to the processor 210 of the wearable device 101. For example, the memory 220 may include volatile memory such as randomaccess memory (RAM) and/or non-volatile memory such as read-only memory (ROM). For example, the volatile memory may include, for example, at least one of dynamic RAM (DRAM), static RAM (SRAM), Cache RAM, and pseudo SRAM (PSRAM). For example, the non-volatile memory may include, for example, at least one of a programmable ROM (PROM), an erasable PROM (EPROM), an electrically erasable PROM (EEPROM), a flash memory, a hard disk, a compact disk, a solid state drive (SSD), and an embedded multi media card (eMMC).

According to an embodiment, in the memory 220 of the wearable device 101, one or more instructions (or commands) representing a calculation and/or operation to be performed on data by the processor 210 of the wearable device 101 may be stored. A set of one or more instructions may be referred to as a program, firmware, operating system, process, routine, sub-routine, and/or software application. Hereinafter, that the software application is installed in the wearable device 101 may refer, for example, to the one or more instructions provided in the form of the software application being stored in the memory 220, and the one or more software applications are stored in an executable format (e.g., a file having an extension preset by the operating system of the wearable device 101) by the processor 210 of the wearable device 101.

For example, programs installed in the wearable device 101 may be classified into any one layer among different layers including a software application layer 231, a framework layer 232, and/or a hardware abstraction layer (HAL) 233, based on the target. For example, in the hardware abstraction layer 233, programs (e.g., drivers) designed to target the hardware (e.g., the communication circuitry 230, the display 240, the camera 250, and/or the sensor 260) of the wearable device 101 may be classified. For example, in the framework layer 232, programs (e.g., RGB/IR pattern recognizer 232-1, six-degree of freedom (6-DoF) analyzer 232-2, and/or ray renderer 232-3) designed to target at least one of the hardware abstraction layer 233 and/or the software application layer 231 may be classified. The programs classified into the framework layer 232 may provide an executable application programming interface (API) based on another program.

According to an embodiment, the wearable device 101 may process information associated with an optical signal (e.g., an optical signal 110 of FIGS. 1A and 1B) obtained from the camera 250 or the sensor 260, based on the execution of the RGB/IR pattern recognizer 232-1. For example, the wearable device 101 may identify a position of the optical signal emitted by the operation of a proximity sensor 267 of the external electronic device 103, using the camera 250 or the sensor 260. For example, the wearable device 101 may identify flicker of the optical signal. The wearable device 101 may identify a position of the external electronic device 103, based on identifying the flicker of the optical signal. The flicker of the optical signal may be an optical signal emitted at a preset period.

According to an embodiment, the wearable device 101 may identify the movement of external electronic device 103, based on the execution of the 6-DoF analyzer 232-2. For example, the wearable device 101 may receive data obtained using an acceleration sensor 263 and/or a gyro sensor 265 of the external electronic device 103. The wearable device 101 may identify the movement of the external electronic device 103, based on the data.

According to an embodiment, the wearable device 101 may display a first visual object (e.g., a first visual object 120 of FIGS. 1A and 1B) and/or a second visual object (e.g., a second visual object 130 of FIGS. 1A and 1B), based on the execution of the ray renderer 232-3. For example, the wearable device 101 may display the first visual object, based on rendering external electronic device 103.

According to an embodiment, the communication circuit 230 of the wearable device 101 may include a hardware component for supporting transmission and/or reception of an electrical signal between the wearable device 101 and an external electronic device. For example, the communication circuit 230 may include at least one of a modem (MODEM), an antenna, and an optic/electronic (O/E) converter. The communication circuit 230 may support the transmission and/or reception of the electrical signal, based on various types of protocols such as ethernet, local area network (LAN), wide area network (WAN), wireless fidelity (WiFi), Bluetooth, and Bluetooth low energy (BLE), ZigBee, long term evolution (LTE), and 5th generation ne radio (5G NR).

For example, the wearable device 101 may transmit a first signal requesting establishment of a communication link with the external electronic device 103, to the external electronic device 130 through the communication circuit 230. For example, the wearable device 101 may receive a second signal in response to the signal for requesting the establishment of the communication link from the external electronic device 103. The wearable device 101 may receive data obtained using the sensor 260 of the external electronic device 103, through the communication circuit 230. For example, the sensor 260 may include the acceleration sensor 263 and/or the gyro sensor 265. For example, the acceleration sensor 263 may output electrical information (or data) representing the magnitude of the gravitational acceleration measured on each of a plurality of preset axes (e.g., x-axis, y-axis, z-axis) perpendicular to each other. For example, the processor 210 of the external electronic device 103 may detect the movement of the external electronic device 103 in a physical space, based on the electrical information output from the acceleration sensor 263. For example, the gyro sensor 265 may obtain electrical information (or data) associated with the rotational speed of the external electronic device 103 (e.g., the angular speed of the external electronic device 103 with respect to preset axes). The external electronic device 103 may transmit the electrical information obtained through the gyro sensor 265 and/or the electrical information obtained through the acceleration sensor 263, to the wearable device 101, through the communication circuit 230. The wearable device 101 receiving the information may display the first visual object corresponding to the movement of the external electronic device 103.

According to an embodiment, the display 240 of the wearable device 101 may output visualized information to a user. For example, the display 240 may output the visualized information to the user, by being controlled by the processor 210 including a circuit such as a graphic processing unit (GPU). The display 240 may include, for example, and without limitation, a flat panel display (FPD), electronic paper, or the like. The FPD may include, for example, and without limitation, a liquid crystal display (LCD), a plasma display panel (PDP), one or more light emitting diodes (LEDs), or the like. The LED may include an organic LED (OLED).

According to an embodiment, the camera 250 of the wearable device 101 may include a lens assembly or an image sensor. The lens assembly may collect light emitted from a subject (e.g., the external electronic device 103 of FIGS. 1A to 1B) that is a target of image photographing. The lens assembly may include one or more lenses. According to an embodiment, the camera 250 may include a plurality of lens assemblies. For example, in the camera 250, a portion of the plurality of lens assemblies may have the same lens property (e.g., angle of view, focal length, autofocus, f number, or optical zoom) or at least one lens assembly may have one or more lens properties different from lens properties of another lens assembly. The lens assembly may include a wide-angle lens or a telephoto lens. According to an embodiment, the image sensor may include, for example, one image sensor selected from among image sensors having different properties such as a RGB sensor, a black and white (BW) sensor, an IR sensor, or a UV sensor, a plurality of image sensors having the same property, or a plurality of image sensors having different property. Each image sensor included in the image sensor may be implemented using, for example, a charged coupled device (CCD) sensor or a complementary metal oxide semiconductor (CMOS) sensor. The wearable device 101 may identify the external electronic device 103 or may identify the optical signal emitted from the external electronic device 103, using the image sensor.

According to an embodiment, the sensor 260 of the wearable device 101 may include a sensor for identifying an optical signal of a preset wavelength band, such as a depth sensor 261. For example, the sensor 260 may include the depth sensor 261. For example, the depth sensor 261 may be the sensor for identifying the optical signal in the preset wavelength band. For example, the depth sensor 261 may include a time-of-flight (ToF) sensor, a structured light, or a light detection and ranging (LiDAR). However, it is not limited thereto. The wearable device 101 may identify the optical signal in the preset wavelength band emitted from the external electronic device 103, based on the depth sensor 261. For example, the preset wavelength band may include an infrared light wavelength band.

The same hardware component as the hardware component included in the wearable device 101 among the hardware components included in the external electronic device 103 may be substantially the same as the hardware component included in the wearable device 101. According to an embodiment, the proximity sensor 267 of the external electronic device 103 may include a magnetic proximity sensor, an optical proximity sensor, an ultrasonic proximity sensor, an inductive proximity sensor, a capacitive sensor, and/or an eddy current sensor. However, it is not limited thereto. According to an embodiment, a flash 270 of the external electronic device 103 may include one or more light emitting diodes (e.g., RGB LED, white LED, infrared LED, or ultraviolet LED) or a xenon lamp. The external electronic device 103 may control the proximity sensor 267 or the flash 270, based on a third signal for controlling the proximity sensor 267 or the flash 270 received from the wearable device 101. For example, the external electronic device 103 may emit the optical signal when the proximity sensor 267 operates. For example, the external electronic device 103 may emit the optical signal in the preset wavelength band. The wearable device 101 may identify the optical signal in the preset wavelength band. The wearable device 101 may identify the position of the external electronic device 103, based on identifying the optical signal in the preset wavelength band. The wearable device 101 may display the first visual object mapped to the position of the external electronic device 103 in the display 240, based on the optical signal emitted from the external electronic device 103.

As described above, according to an embodiment, the wearable device 101 may identify the external electronic device 103. The wearable device 101 may display the first visual object mapped to the position of the optical signal, based on the optical signal emitted from the external electronic device 103. The wearable device 101 may enhance the user experience of the wearable device 101 by displaying the first visual object that matches the position of the external electronic device 103 based on the optical signal. The wearable device 101 may enhance the user experience of the wearable device 101, by providing a realistic VR environment by displaying the first visual object based on the position of the external electronic device 103 and/or the position of the optical signal emitted from the external electronic device 103.

Hereinafter, an example of a form factor of the wearable device 101 according to an embodiment will be described using FIGS. 3A, 3B, 4A and 4B.

Figure 3A:
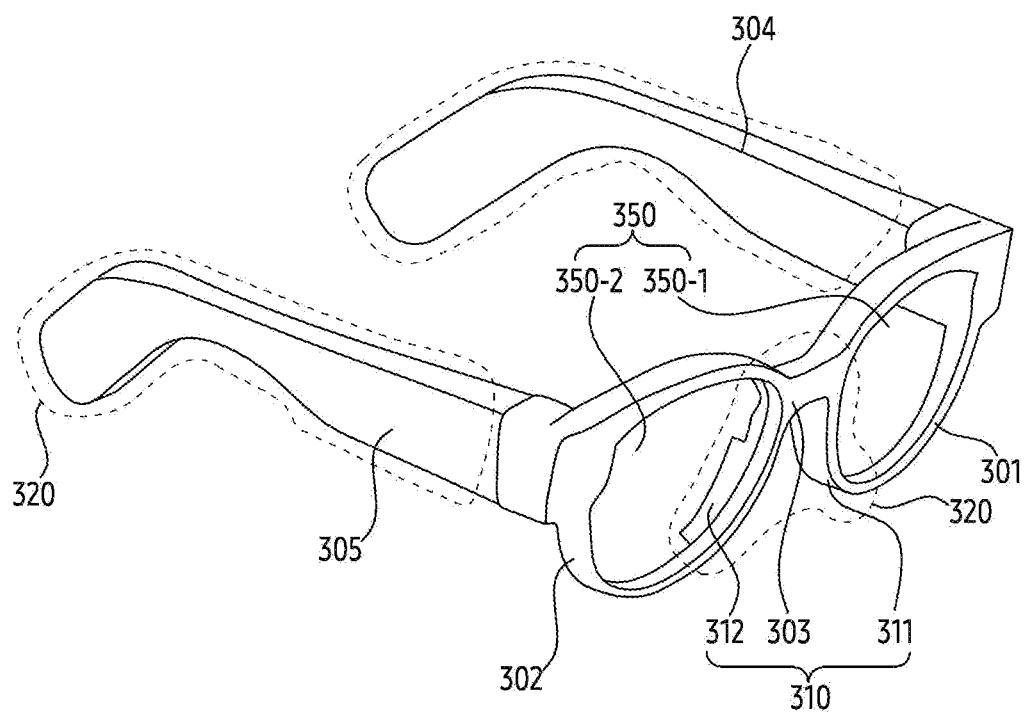
FIG. 3A is a perspective view illustrating a wearable device according to an embodiment.
Figure 3B:
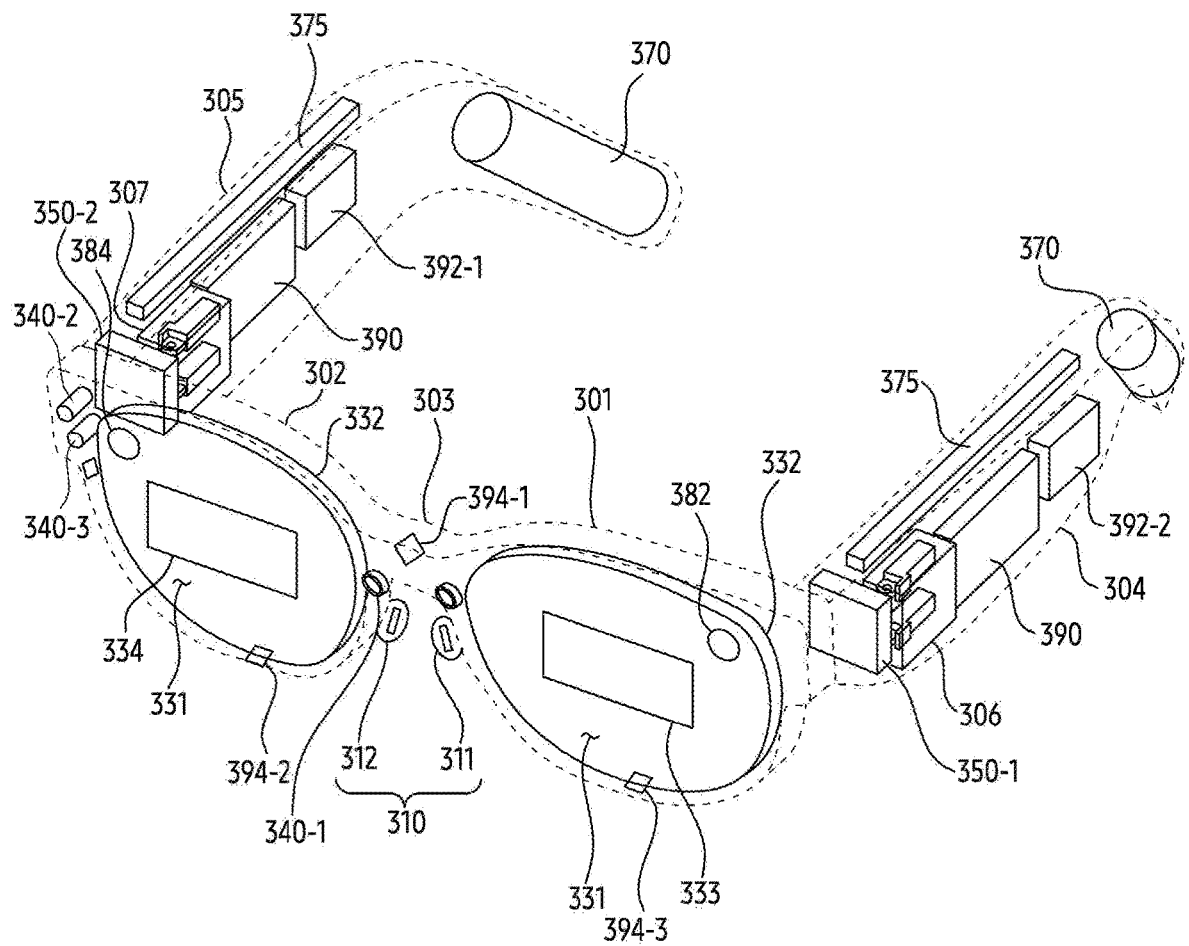
FIG. 3B is a perspective view illustrating of one or more hardware disposed in a wearable device according to an embodiment.

FIG. 3A is a perspective view illustrating an example wearable device 300 according to an embodiment. FIG. 3B is a perspective view illustrating one or more hardware disposed in a wearable device according to an embodiment. The wearable device 300 of FIGS. 3A and 3B may include the wearable device 101 of FIGS. 1A and 1B and/or FIG. 2. As shown in FIG. 3A, according to an embodiment, the wearable device 300 may include at least one display 350 and a frame supporting the at least one display 350.

According to an embodiment, the wearable device 300 may be wearable on a portion of the user's body. The wearable device 300 may provide augmented reality (AR), virtual reality (VR), or mixed reality (MR) combining the augmented reality and the virtual reality to a user wearing the wearable device 300. For example, the wearable device 300 may output a virtual reality image to a user through the at least one display 350 in response to a user's preset gesture obtained through a motion recognition camera 340-2 of FIG. 3B.

According to an embodiment, the at least one display 350 in the wearable device 300 may provide visual information to a user. The at least one display 350 may include the display 220 of FIG. 2. For example, the at least one display 350 may include a transparent or translucent lens. The at least one display 350 may include a first display 350-1 and/or a second display 350-2 spaced apart from the first display 350-1. For example, the first display 350-1 and the second display 350-2 may be disposed at positions corresponding to the user's left and right eyes, respectively.

Referring to FIG. 3B, the at least one display 350 may provide another visual information, which is distinct from the visual information, together with the visual information included in the ambient light passing through the lens, a user wearing the wearable device 300, by forming a displaying area on the lens. The lens may be formed based on at least one of a fresnel lens, a pancake lens, or a multi-channel lens. For example, the displaying area formed by the at least one display 350 may be formed on the second surface 332 among the first surface 331 and the second surface 332 of the lens. When the user wears the wearable device 300, the ambient light may be transmitted to the user by being incident on the first surface 331 and being penetrated through the second surface 332. For another example, the at least one display 350 may display the virtual reality image to be combined with a real screen transmitted through the ambient light. The virtual reality image output from the at least one display 350 may be transmitted to the user's eyes through the one or more hardware (e.g., optical devices 382 and 384, and/or at least one waveguides 333 and 334)) included in the wearable device 300.

According to an embodiment, the wearable device 300 may include the waveguides 333 and 334 that diffracts light transmitted from the at least one display 350 and relayed by the optical devices 382 and 384 and transmits it to the user. The waveguides 333 and 334 may be formed based on at least one of glass, plastic, or polymer. A nano pattern may be formed on at least a portion of the outside or inside of the waveguides 333 and 334. The nano pattern may be formed based on a grating structure having a polygonal or curved shape. Light incident to one end of the waveguides 333 and 334 may be propagated to the other end of the waveguides 333 and 334 by the nano pattern. The waveguides 333 and 334 may include at least one of at least one diffraction element (e.g., a diffractive optical element (DOE), a holographic optical element (HOE)), and a reflection element (e.g., a reflection mirror). For example, the waveguides 333 and 334 may be disposed in the wearable device 300 to guide a screen displayed by the at least one display 350 to the user's eyes. For example, the screen may be transmitted to the user's eyes based on total internal reflection (TIR) generated in the waveguides 333 and 334.

According to an embodiment, the wearable device 300 may analyze an object included in a real image collected through a photographing camera 340-1, combine virtual object corresponding to an object that become a subject of augmented reality provision among the analyzed object, and display them on the at least one display 350. The virtual object may include at least one of text and images for various information associated with the object included in the real image. The wearable device 300 may analyze the object based on a multi-camera such as a stereo camera. For the object analysis, the wearable device 300 may execute time-of-flight (ToF) and/or simultaneous localization and mapping (SLAM) supported by the multi-camera. The user wearing the wearable device 300 may watch an image displayed on the at least one display 350.

According to an embodiment, the frame may be configured with a physical structure in which the wearable device 300 may be worn on the user's body. According to an embodiment, the frame may be configured so that when the user wears the wearable device 300, the first display 350-1 and the second display 350-2 may be positioned corresponding to the user's left and right eyes. The frame may support the at least one display 350. For example, the frame may support the first display 350-1 and the second display 350-2 to be positioned at positions corresponding to the user's left and right eyes.

Referring to FIG. 3A, according to an embodiment, the frame may include an area 320 at least partially in contact with the portion of the user's body in case that the user wears the wearable device 300. For example, the area 320 in contact with the portion of the user's body of the frame may include an area contacting a portion of the user's nose, a portion of the user's ear, and a portion of the side of the user's face that the wearable device 300 contacts. According to an embodiment, the frame may include a nose pad 310 that is contacted on the portion of the user's body. When the wearable device 300 is worn by the user, the nose pad 310 may be contacted on the portion of the user's nose. The frame may include a first temple 304 and a second temple 305 that is contacted on another portion of the user's body that is distinct from the portion of the user's body.

For example, the frame may include a first rim 301 surrounding at least a portion of the first display 350-1, a second rim 302 surrounding at least a portion of the second display 350-2, a bridge 303 disposed between the first rim 301 and the second rim 302, a first pad 311 disposed along a portion of the edge of the first rim 301 from one end of the bridge 303, a second pad 312 disposed along a portion of the edge of the second rim 302 from the other end of the bridge 303, the first temple 304 extending from the first rim 301 and fixed to a portion of the wearer's ear, and the second temple 305 extending from the second rim 302 and fixed to a portion of the ear opposite to the ear. The first pad 311 and the second pad 312 may be in contact with the portion of the user's nose, and the first temple 304 and the second temple 305 may be in contact with a portion of the user's face and the portion of the user's ear. The temples 304 and 305 may be rotatably connected to the rim through hinge units 306 and 307 of FIG. 3B. The first temple 304 may be rotatably connected with respect to the first rim 301 through the first hinge unit 306 disposed between the first rim 301 and the first temple 304. The second temple 305 may be rotatably connected with respect to the second rim 302 through the second hinge unit 307 disposed between the second rim 302 and the second temple 305. According to an embodiment, the wearable device 300 may identify an external object (e.g., a user's fingertip) touching the frame and/or a gesture performed by the external object using a touch sensor, a grip sensor, and/or a proximity sensor formed on at least a portion of the surface of the frame.

According to an embodiment, the wearable device 300 may include hardware (e.g., hardware described above based on the block diagram of FIG. 2) that performs various functions. For example, the hardware may include a battery module 370, an antenna module 375, the optical devices 382 and 384, speakers 392-1 and 392-2, microphones 394-1, 394-2, and 394-3, a light emitting module (not illustrated), and/or a printed circuit board 390. Various hardware may be disposed in the frame.

According to an embodiment, the microphone 394-1, 394-2, and 394-3 of the wearable device 300 may obtain a sound signal, by being disposed on at least a portion of the frame. The first microphone 394-1 disposed on the nose pad 310, the second microphone 394-2 disposed on the second rim 302, and the third microphone 394-3 disposed on the first rim 301 are illustrated in FIG. 3B, but the number and disposition of the microphone 394 are not limited to an embodiment of FIG. 3B. In case that the number of the microphone 394 included in the wearable device 300 is two or more, the wearable device 300 may identify the direction of the sound signal using a plurality of microphones disposed on different portions of the frame.

According to an embodiment, the optical devices 382 and 384 may transmit the virtual object transmitted from the at least one display 350 to the waveguides 333 and 334. For example, the optical devices 382 and 384 may be a projector. The optical devices 382 and 384 may be disposed adjacent to the at least one display 350 or may be included in the at least one display 350 as portion of the at least one display 350. The first optical device 382 may correspond to the first display 350-1, and the second optical device 384 may correspond to the second display 350-2. The first optical device 382 may transmit the light output from the first display 350-1 to the first waveguide 333, and the second optical device 384 may transmit light output from the second display 350-2 to the second waveguide 334.

In an embodiment, a camera 340 may include an eye tracking camera (ET CAM) 340-1, the motion recognition camera 340-2, and/or the photographing camera 340-3. The photographing camera 340-3, the eye tracking camera 340-1, and the motion recognition camera 340-2 may be disposed at different positions on the frame and may perform different functions. The photographing camera 340-3, the eye tracking camera 340-1, and the motion recognition camera 340-2 may be an example of the camera 225 of FIG. 2. The eye tracking camera 340-1 may output data indicating the gaze of the user wearing the wearable device 300. For example, the wearable device 300 may detect the gaze from an image including the user's pupil obtained through the eye tracking camera 340-1. An example in which the eye tracking camera 340-1 is disposed toward the user's right eye is illustrated in FIG. 3B, but the embodiment is not limited thereto, and the eye tracking camera 340-1 may be disposed alone toward the user's left eye or may be disposed toward two eyes.

In an embodiment, the photographing camera 340-3 may photograph a real image or background to be matched with a virtual image in order to implement the augmented reality or mixed reality content. The photographing camera may photograph an image of a specific object existing at a position viewed by the user and may provide the image to the at least one display 350. The at least one display 350 may display one image in which a virtual image provided through the optical devices 382 and 384 is overlapped with information on the real image or background including an image of the specific object obtained using the photographing camera. In an embodiment, the photographing camera may be disposed on the bridge 303 disposed between the first rim 301 and the second rim 302.

In an embodiment, the eye tracking camera 340-1 may implement a more realistic augmented reality by matching the user's gaze with the visual information provided on the at least one display 350 by tracking the gaze of the user wearing the wearable device 300. For example, when the user looks at the front, the wearable device 300 may naturally display environment information associated with the user's front on the at least one display 350 at the position where the user is positioned. The eye tracking camera 340-1 may be configured to capture an image of the user's pupil in order to determine the user's gaze. For example, the eye tracking camera 340-1 may receive gaze detection light reflected from the user's pupil and may track the user's gaze based on the position and movement of the received gaze detection light. In an embodiment, the eye tracking camera 340-1 may be disposed at a position corresponding to the user's left and right eyes. For example, the eye tracking camera 340-1 may be disposed in the first rim 301 and/or the second rim 302 to face the direction in which the user wearing the wearable device 300 is positioned.

In an embodiment, the motion recognition camera 340-2 may provide a specific event to the screen provided on the at least one display 350 by recognizing the movement of the whole or portion of the user's body, such as the user's torso, hand, or face. The motion recognition camera 340-2 may obtain a signal corresponding to the gesture by recognizing the user's gesture, and may provide a display corresponding to the signal to the at least one display 350. The processor may identify a signal corresponding to the operation and may perform a preset function based on the identification. In an embodiment, the motion recognition camera 340-2 may be disposed on the first rim 301 and/or the second rim 302.

In an embodiment, the camera 340 included in the wearable device 300 is not limited to the above-described eye tracking camera (ET CAM) 340-1 and motion recognition camera 340-2. For example, the wearable device 300 may identify an external object included in the FoV, using the photographing camera 340-3 disposed toward the user's FoV. That the wearable device 300 identifies the external object may be performed based on a sensor for identifying a distance between the wearable device 300 and the external object, such as a depth sensor and/or a time of flight (ToF) sensor. The camera 340 disposed toward the FoV may support an autofocus function and/or an optical image stabilization (OIS) function. For example, the wearable device 300 may include the camera 340 (e.g., a face tracking (FT) camera) disposed toward the face, in order to obtain an image including the face of the user wearing the wearable device 300. For example, the camera 340 may detect the optical signal output from the external electronic device. For example, the camera 340 may detect an optical signal (e.g., an optical signal of a wavelength of an infrared light band) of a wavelength of a band in which the optical signal output from the external electronic device is different from an optical signal of a wavelength of the visible light band.

Although not illustrated, the wearable device 300 according to an embodiment may further include a light source (e.g., LED) that emits light toward a subject (e.g., user's eyes, face, and/or an external object in the FoV) photographed using the camera 340. The light source may include an LED having an infrared wavelength. The light source may be disposed on at least one of the frame, and the hinge units 306 and 307.

According to an embodiment, the battery module 370 may supply power to electronic components of the wearable device 300. In an embodiment, the battery module 370 may be disposed in the first temple 304 and/or the second temple 305. For example, the battery module 370 may be a plurality of battery modules 370. The plurality of battery modules 370, respectively, may be disposed on each of the first temple 304 and the second temple 305. In an embodiment, the battery module 370 may be disposed at an end of the first temple 304 and/or the second temple 305.

In an embodiment, the antenna module 375 may transmit the signal or power to the outside of the wearable device 300 or may receive the signal or power from the outside. The antenna module 375 may be electronically and/or operably connected to a communication circuit (e.g., the communication circuit 235 of FIG. 2) of the wearable device 300. In an embodiment, the antenna module 375 may be disposed in the first temple 304 and/or the second temple 305. For example, the antenna module 375 may be disposed close to one surface of the first temple 304 and/or the second temple 305.

In an embodiment, the speakers 392-1 and 392-2 may output a sound signal to the outside of the wearable device 300. A sound output module may be referred to as a speaker. In an embodiment, the speakers 392-1 and 392-2 may be disposed in the first temple 304 and/or the second temple 305 in order to be disposed adjacent to the ear of the user wearing the wearable device 300. For example, the wearable device 300 may include the second speaker 392-2 disposed adjacent to the user's left ear by being disposed in the first temple 304, and the first speaker 392-1 disposed adjacent to the user's right ear by being disposed in the second temple 305.

In an embodiment, the light emitting module (not illustrated) may include at least one light emitting element. The light emitting module may emit light of a color corresponding to a specific state or may emit light through an operation corresponding to the specific state in order to visually provide information on a specific state of the wearable device 300 to the user. For example, in case that the wearable device 300 needs charging, it may repeatedly emit red light at a preset timing. In an embodiment, the light emitting module may be disposed on the first rim 301 and/or the second rim 302.

Referring to FIG. 3B, according to an embodiment, the wearable device 300 may include the printed circuit board (PCB) 390. The PCB 390 may be included in at least one of the first temple 304 or the second temple 305. The PCB 390 may include an interposer disposed between at least two sub PCBs. On the PCB 390, one or more hardware (e.g., hardware illustrated by the blocks described above with reference to FIG. 2) included in the wearable device 300 may be disposed. The wearable device 300 may include a flexible PCB (FPCB) for interconnecting the hardware.

According to an embodiment, the wearable device 300 may include at least one of a gyro sensor, a gravity sensor, and/or an acceleration sensor for detecting the posture of the wearable device 300 and/or the posture of a body part (e.g., a head) of the user wearing the wearable device 300. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 300 may identify the user's motion and/or gesture performed to execute or stop a specific function of the wearable device 300 based on the IMU.

According to an embodiment, the wearable device 300 may identify the external electronic device (e.g., the external electronic device 103 of FIGS. 1A to 1B), using the camera 340. For example, the wearable device 300 may identify the external electronic device based on an image output from the photographing camera 340-3. For example, the wearable device 300 may identify the optical signal output from the external electronic device, in the image output from the photographing camera 340-3. The wearable device 300 may output a visual object corresponding to the external electronic device through the wave guides 333 and 334 and/or the display 350, based on identifying the optical signal. The wearable device 300 may enhance the user experience of the wearable device 300, by outputting the visual object that matches the position of the external electronic device.

Figure 4A:
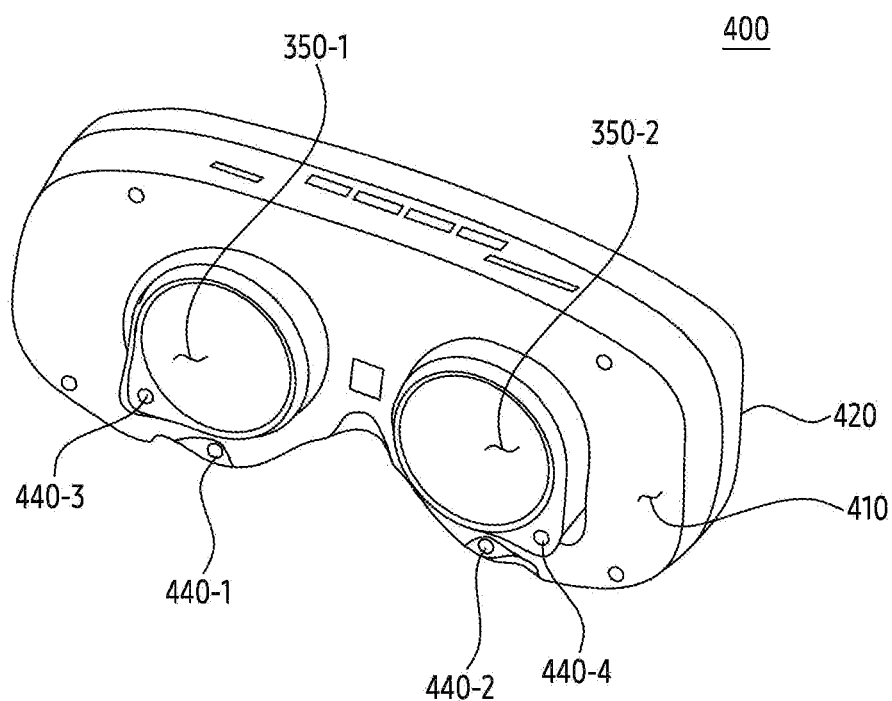
FIGS. 4A and 4B are perspective views illustrating an example appearance of a wearable device according to an embodiment.
Figure 4B:
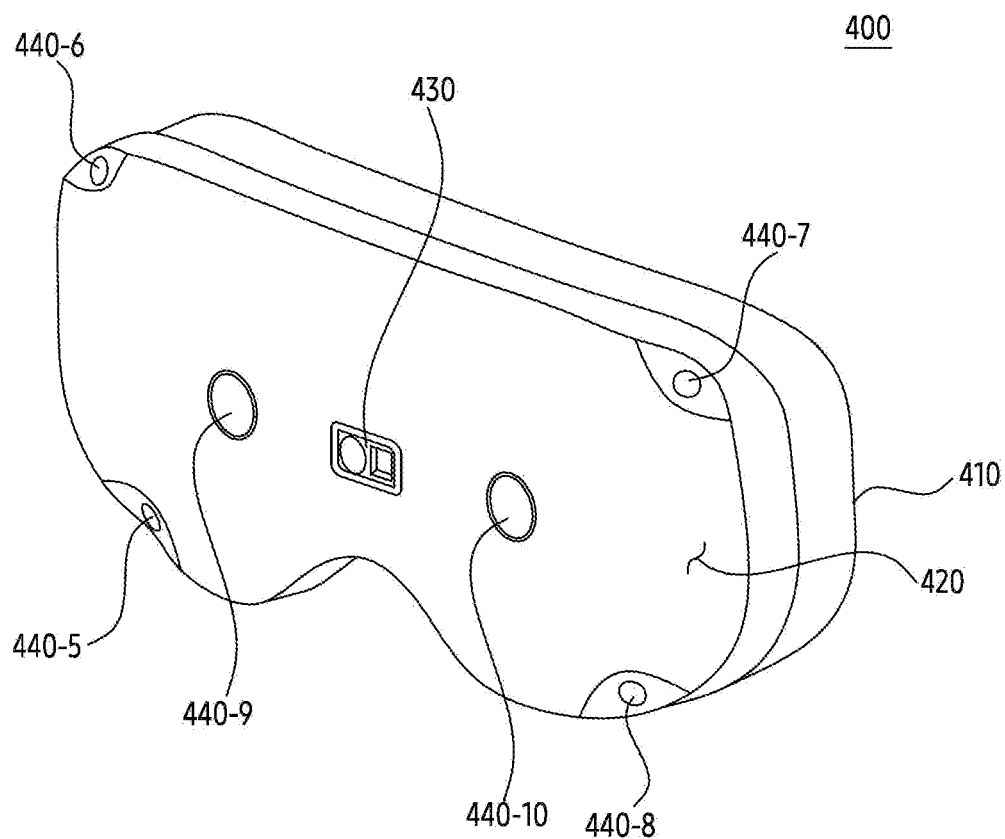

FIGS. 4A and 4B illustrate an example of the appearance of a wearable device according to an embodiment. The wearable device 400 of FIGS. 4A and 4B may include the wearable device 101 of FIGS. 1A and 1B and/or FIG. 2. According to an embodiment, an example of an appearance of a first surface 410 of the housing of the wearable device 400 may be illustrated in FIG. 4A, and an example of an appearance of a second surface 420 opposite to the first surface 410 may be illustrated in FIG. 4B.

Referring to FIG. 4A, according to an embodiment, the first surface 410 of the wearable device 400 may have an attachable shape on the user's body part (e.g., the user's face). Although not illustrated, the wearable device 400 may further include a strap for being fixed on the user's body part, and/or one or more temples (e.g., a first temple 304 and/or a second temple 305 of FIGS. 3A to 3B). A first display 350-1 for outputting an image to the left eye among the user's two eyes and a second display 350-2 for outputting an image to the right eye among the user's two eyes may be disposed on the first surface 410. The wearable device 400 may be formed on the first surface 410 and may further include rubber or silicon packing for preventing and/or reducing interference by light (e.g., ambient light) different from the light emitted from the first display 350-1 and the second display 350-2.

According to an embodiment, the wearable device 400 may include cameras 440-3 and 440-4 for photographing and/or tracking two eyes of the user adjacent to each of the first display 350-1 and the second display 350-2. The cameras 440-3 and 440-4 may be referred to as ET cameras.

According to an embodiment, the wearable device 400 may include cameras 440-1 and 440-2 for photographing and/or recognizing the user's face. The cameras 440-1 and 440-2 may be referred to as FT cameras.

Referring to FIG. 4B, a camera (e.g., cameras 440-5, 440-6, 440-7, 440-8, 440-9, and 440-10), and/or a sensor (e.g., a depth sensor 430) for obtaining information associated with the external environment of the wearable device 400 may be disposed on the second surface 420 opposite to the first surface 410 of FIG. 4A. For example, the cameras 440-5, 440-6, 440-7, 440-8, 440-9, and 440-10 may be disposed on the second surface 420 to recognize an external object different from the wearable device 400. For example, using cameras 440-9, and 440-10, the wearable device 400 may obtain an image and/or video to be transmitted to each of the user's two eyes. The camera 440-9 may be disposed on the second surface 420 of the wearable device 400 to obtain an image to be displayed through the second display 350-2 corresponding to the right eye among the two eyes. The camera 440-10 may be disposed on the second surface 420 of the wearable device 400 to obtain an image to be displayed through the first display 350-1 corresponding to the left eye among the two eyes.

According to an embodiment, the wearable device 400 may include the depth sensor 430 disposed on the second surface 420 in order to identify a distance between the wearable device 400 and the external object. Using the depth sensor 430, the wearable device 400 may obtain spatial information (e.g., a depth map) about at least a portion of the FoV of the user wearing the wearable device 400.

Although not illustrated, a microphone for obtaining sound output from the external object may be disposed on the second surface 420 of the wearable device 400. The number of microphones may be one or more depending on embodiments.

According to an embodiment, the wearable device 400 may identify an optical signal emitted from an external electronic device (e.g., an external electronic device 103 of FIGS. 1A and 1B) using the depth sensor 430. The wearable device 400 may output a visual object matching a position of the external electronic device through the display 350, based on identifying the position of the optical signal. The wearable device 400 may enhance the user experience of the wearable device 400, by outputting the visual object matching the position of the external electronic device.

Figure 5A:
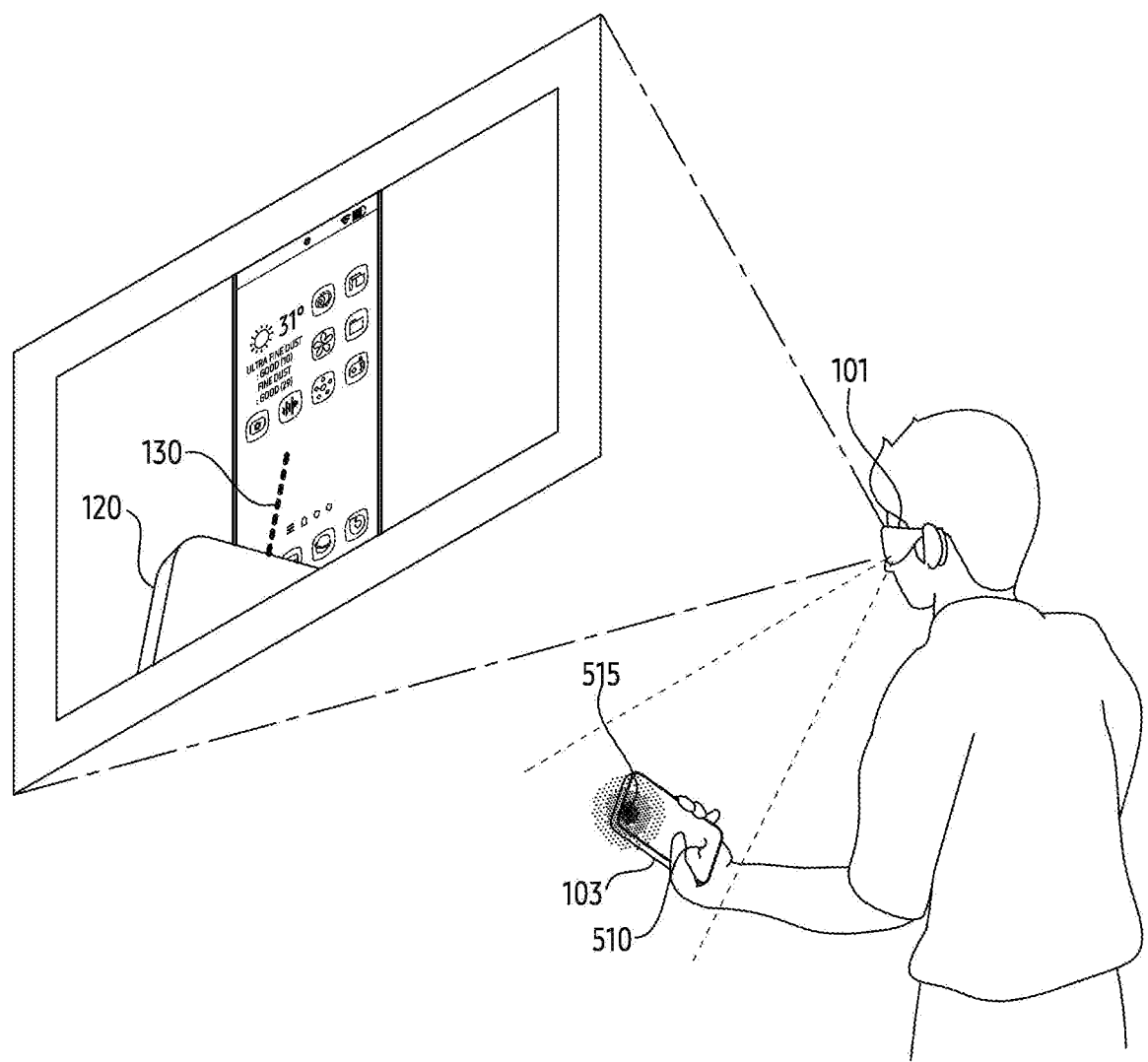
FIG. 5A is a diagram illustrating an example of a wearable device identifying an external electronic device according to an embodiment.
Figure 5B:
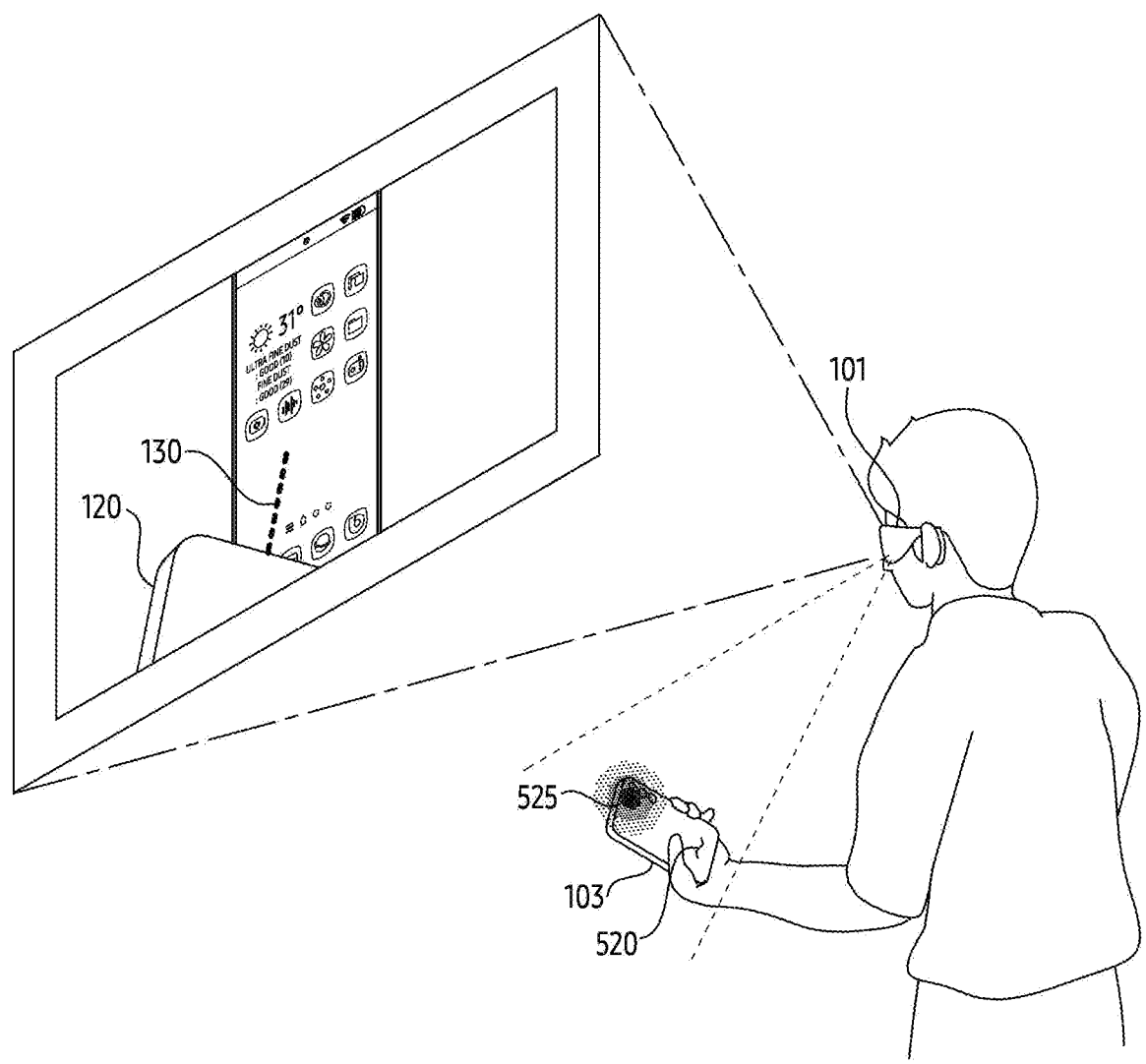
FIG. 5B is a diagram illustrating an example of a wearable device identifying an external electronic device according to an embodiment.

FIG. 5A is a diagram illustrating an example of a wearable device identifying an external electronic device according to an embodiment. FIG. 5B is a diagram illustrating an example of a wearable device identifying an external electronic device according to an embodiment. A wearable device 101 of FIGS. 5A and 5B may include the wearable device 101 of FIGS. 1A, 1B, and/or 2. The wearable device 101 of FIGS. 5A and 5B may include a wearable device 300 of FIGS. 3A and 3B. The wearable device 101 of FIGS. 5A and 5B may include a wearable device 400 of FIGS. 4A and 4B. Operations of FIGS. 5A and 5B may be performed by a processor 210 of FIG. 2.

Referring to FIGS. 5A and 5B, according to an embodiment, the wearable device 101 may obtain an image using a camera (e.g., a camera 250 of FIG. 2). The wearable device 101 may identify an external electronic device 103 in the image. The wearable device 101 may identify a portion including the external electronic device 103 in the image. According to an embodiment, the wearable device 101 may receive state information associated with a shape of the external electronic device 103 from the external electronic device 103. For example, the state information may include different information according to a form factor of the external electronic device 103. For example, in case that the external electronic device 103 is a foldable device, the state information may include a folded shape and/or an unfolded shape. For example, the state information may include a reduced state and/or an expanded state in case that the external electronic device 103 is a rollable device. However, it is not limited thereto. According to an embodiment, the wearable device 101 may predict a size of the external electronic device 103 identified in the image, based on receiving the state information. The wearable device 101 can identify the external electronic device 103 in the image, based on the size of the external electronic device 103. The wearable device 101 may identify an optical signal 515 emitted from the external electronic device 103, based on identifying the external electronic device 103.

Referring to FIG. 5A, the wearable device 101 may identify the optical signal 515 output from the external electronic device 103, in a portion including the external electronic device 103. The wearable device 101 may identify a position of the optical signal 515 in the image. The external electronic device 103 may output the optical signal 515 in a preset wavelength band when a proximity sensor included in the external electronic device 103 operates. For example, the external electronic device 103 may emit the optical signal 515 in at least a portion of one surface 510. The wearable device 101 may identify the optical signal 515 emitted from at least a portion of the one surface 510 of the external electronic device 103. The wearable device 101 may identify the position of the optical signal 515. For example, the position of the optical signal 515 may be a position of a light source of the optical signal 515.

According to an embodiment, the wearable device 101 may render the external electronic device 103, based on a position of the external electronic device 103 identified in the image and/or the position of the optical signal 515 emitted from the external electronic device 103. The wearable device 101 may display a first visual object 120 mapped to the position of the external electronic device 103 and/or the optical signal 515, based on rendering the external electronic device 103. For example, the first visual object 120 may have a shape that matches the external electronic device 103 or may be represented in a different shape from the external electronic device 103. The wearable device 101 may display a second visual object 130 having a shape extended from the first visual object 120. For example, the second visual object 130 may have a shape extended from at least a portion of the first visual object 120 and may perform an operation for pointing at a visual object in the display.

Referring to FIG. 5B, according to an embodiment, the wearable device 101 may identify an optical signal 525 output from a flash (e.g., a flash 270 of FIG. 2) disposed on one surface 520 of the external electronic device 103. The wearable device 101 may identify a position of the optical signal 525, based on identifying the optical signal 525 output from the flash. The wearable device 101 may display the first visual object 120 based on the position of the external electronic device 103 and the position of the optical signal 525, based on identifying the position of the optical signal 525. For example, the wearable device 101 may display the first visual object 120 mapped to the position of the external electronic device 103 and/or the position of the optical signal 525. The wearable device 101 may display the second visual object 130 having the shape extended from the first visual object 120. The wearable device 101 may display the second visual object 130 having the shape extended from at least a portion of the first visual object 120. The wearable device 101 may display the second visual object 130 having a shape extended from a portion mapped to the position of the optical signal 525.

Referring to FIGS. 5A and 5B, according to an embodiment, the wearable device 101 may receive data obtained based on a sensor included in the external electronic device 103, from the external electronic device 103. For example, the data may include data associated with the movement of the external electronic device 103. For example, the data may include data corresponding to a coordinate value of the external electronic device 103. For example, the data may be obtained based on an acceleration sensor (e.g., an acceleration sensor 263 of FIG. 2) and/or a gyro sensor (e.g., a gyro sensor 265 of FIG. 2) of the external electronic device 103. For example, the wearable device 101 may control the first visual object 120 and/or the second visual object 130 displayed through the display, based on the reception of the data associated with the movement of the external electronic device 103. The wearable device 101 may display the first visual object 120 matching the movement of the external electronic device 103. For example, the wearable device 101 may display the second visual object 130 having the shape extended from the first visual object 120 and change a pointing direction of the second visual object 130 based on the movement of the external electronic device 103.

As described above, according to an embodiment, the wearable device 101 may identify the position of the external electronic device 103 and/or the position of the optical signals 515 and 525. The wearable device 101 may display the first visual object 120 and/or the second visual object 130 mapped to the position of the external electronic device 103 and/or the position of the optical signals 515 and 525. The wearable device 101 may control the first visual object 120 and/or the second visual object 130, based on the movement of the external electronic device 103. The wearable device 101 may display the first visual object 120 and/or the second visual object 130 based on the position of the external electronic device 103 and/or the position of the optical signals 515 and 525, and enhance the user experience of the wearable device 101 by changing the first visual object 120 and/or the second visual object 130 based on the movement of the external electronic device 103.

Figure 6:
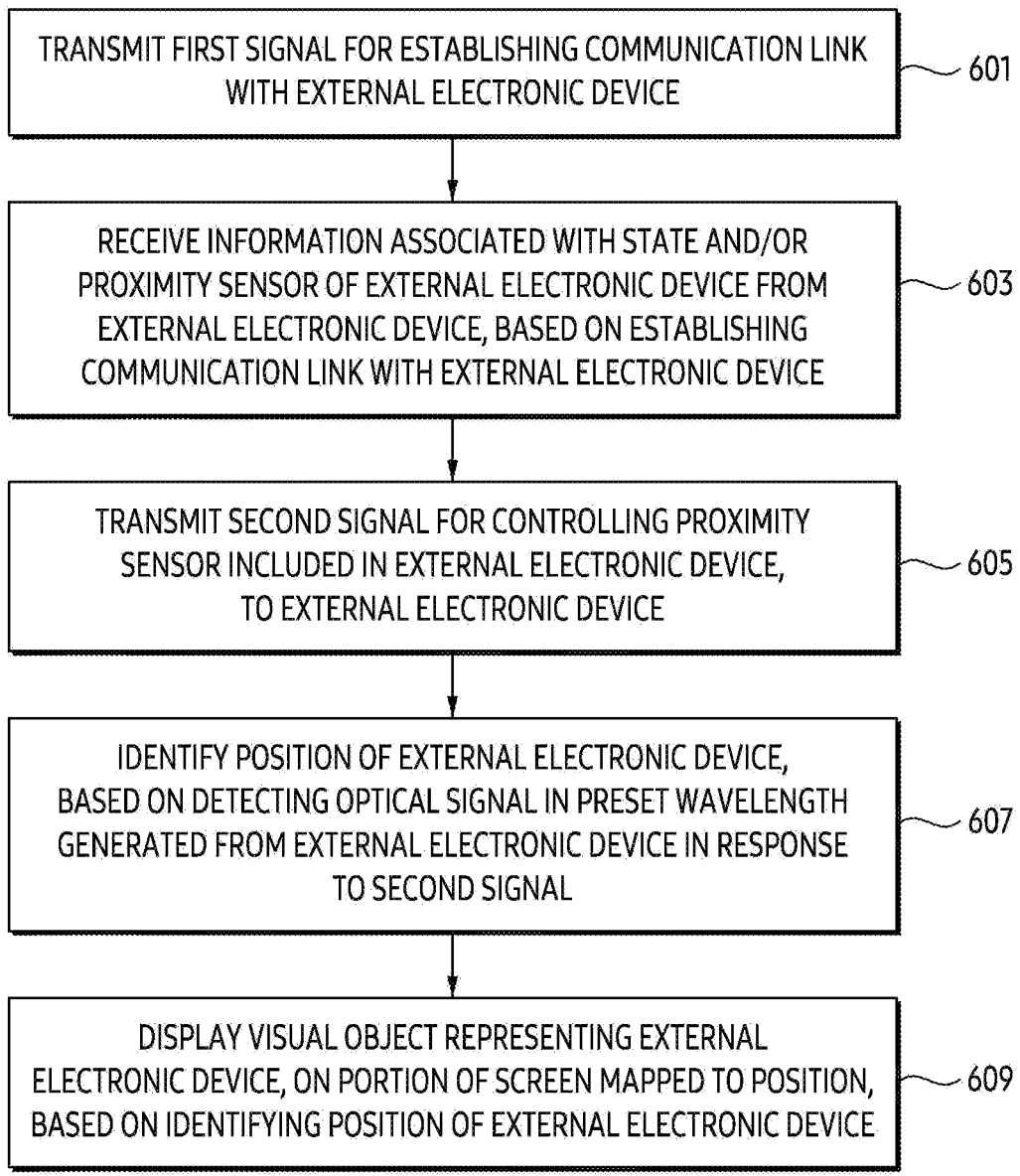
FIG. 6 is a flowchart illustrating an example operation of a wearable device according to an embodiment.

FIG. 6 is a flowchart illustrating an example operation of a wearable device according to an embodiment. The wearable device of FIG. 6 may include a wearable device 101 of FIGS. 1A, 1B, 2, 5A, and/or 5B. The wearable device of FIG. 6 may include a wearable device 300 of FIGS. 3A and 3B. The wearable device of FIG. 6 may include a wearable device 400 of FIGS. 4A and 4B. Operations of FIG. 6 may be performed by a processor 210 of FIG. 2. In the following embodiment, each operation may be performed sequentially, but is not necessarily performed sequentially. For example, the order of each operation may be changed, and at least two operations may be performed in parallel. For example, at least a portion of the operations to be described later may be omitted.

Referring to FIG. 6, in operation 601, according to an embodiment, the wearable device may transmit a first signal for establishing a communication link with an external electronic device (e.g., an external electronic device 103 of FIGS. 1A, 1B, 2, and/or 5) to the external electronic device, through a communication circuit (e.g., a communication circuit 230 of FIG. 2). For example, the wearable device may transmit the first signal for establishing the communication link to use the external electronic device as a controller. The wearable device may establish the communication link based on the external electronic device in response to the first signal.

In operation 603, according to an embodiment, the wearable device may receive information from the external electronic device, based on establishing the communication link with the external electronic device. The wearable device may receive information associated with a state (e.g., whether the external electronic device, which is a foldable device, is opened or closed, and whether the external electronic device, which is a rollable device, is expanded) and/or a proximity sensor of the external electronic device. For example, the wearable device may receive the information associated with the proximity sensor of the external electronic device. For example, the information associated with the proximity sensor may include whether the proximity sensor is included in the external electronic device. For example, the information associated with the proximity sensor may include capability information of the proximity sensor included in the external electronic device.

According to an embodiment, the wearable device may receive information associated with the state of the external electronic device. For example, the information associated with the state of the external electronic device may include information associated with a shape of the external electronic device based on the form factor of the external electronic device. For example, in case that the external electronic device is the foldable device, the external electronic device may transmit state information associated with an angle between a first housing and a second housing of the external electronic device to the wearable device. The wearable device may predict a size of the external electronic device, based on receiving the state information. The wearable device may identify the size of the external electronic device to be identified in the image, based on the prediction of the size. According to an embodiment, in case that the external electronic device is the rollable device, the external electronic device may transmit state information associated with a slide-in state in which a display of the external electronic device has a first size and/or a slide-out state in which the display of the external electronic device has a second size greater than the first size, to the wearable device. In case that the external electronic device has a size greater than the first size and less than the second size, the external electronic device may transmit information associated with a size between the first size and the second size, to the wearable device. The wearable device may identify the size of the external electronic device to be identified in the image, based on the reception of the state information associated with the size of the external electronic device. The wearable device may identify the external electronic device in the image, based on the identification of the size.

In operation 605, according to an embodiment, the wearable device may transmit a second signal for controlling the proximity sensor included in the external electronic device, to the external electronic device. For example, the wearable device may transmit the second signal for operating the proximity sensor at a preset period. For example, in case that the proximity sensor of the external electronic device operates at the preset period, an optical signal emitted from the external electronic device may be emitted at substantially the same period as the preset period. According to an embodiment, the wearable device may detect the optical signal emitted from the external electronic device.

In operation 607, according to an embodiment, the wearable device may detect an optical signal in a preset wavelength band generated from the external electronic device in response to the second signal. The wearable device may identify a position of the external electronic device based on detecting the optical signal. For example, the wearable device may identify the position of the external electronic device, based on the optical signal detected at the preset period.

In operation 609, according to an embodiment, the wearable device may display a visual object representing the external electronic device, on a portion of the screen mapped to the position, based on identifying the position of the external electronic device. For example, the wearable device may display a first visual object that renders the external electronic device on a portion of a screen mapped to the position. For example, the wearable device may display a second visual object having a shape extended from the first visual object. For example, the second visual object may be a visual object having a beam shape and for selecting visual objects displayed on the screen.

As described above, according to an embodiment, the wearable device may detect the optical signal emitted from the external electronic device. For example, the wearable device may detect the optical signal emitted at the preset period. For example, the wearable device may detect an optical signal in the preset wavelength band. The wearable device may identify a position of an external electronic device corresponding to the optical signal, based on detecting the optical signal. The wearable device may display the first visual object representing the external electronic device, on a portion of the screen mapped to the position. The wearable device may display the second visual object having a beam shape extended from the first visual object. The wearable device may enhance the user experience of the wearable device, by displaying the first visual object and/or the second visual object based on the position of the external electronic device. The wearable device may provide a realistic VR experience, by displaying the first visual object and/or the second visual object on a portion of the screen mapped to the position.

Figure 7A:
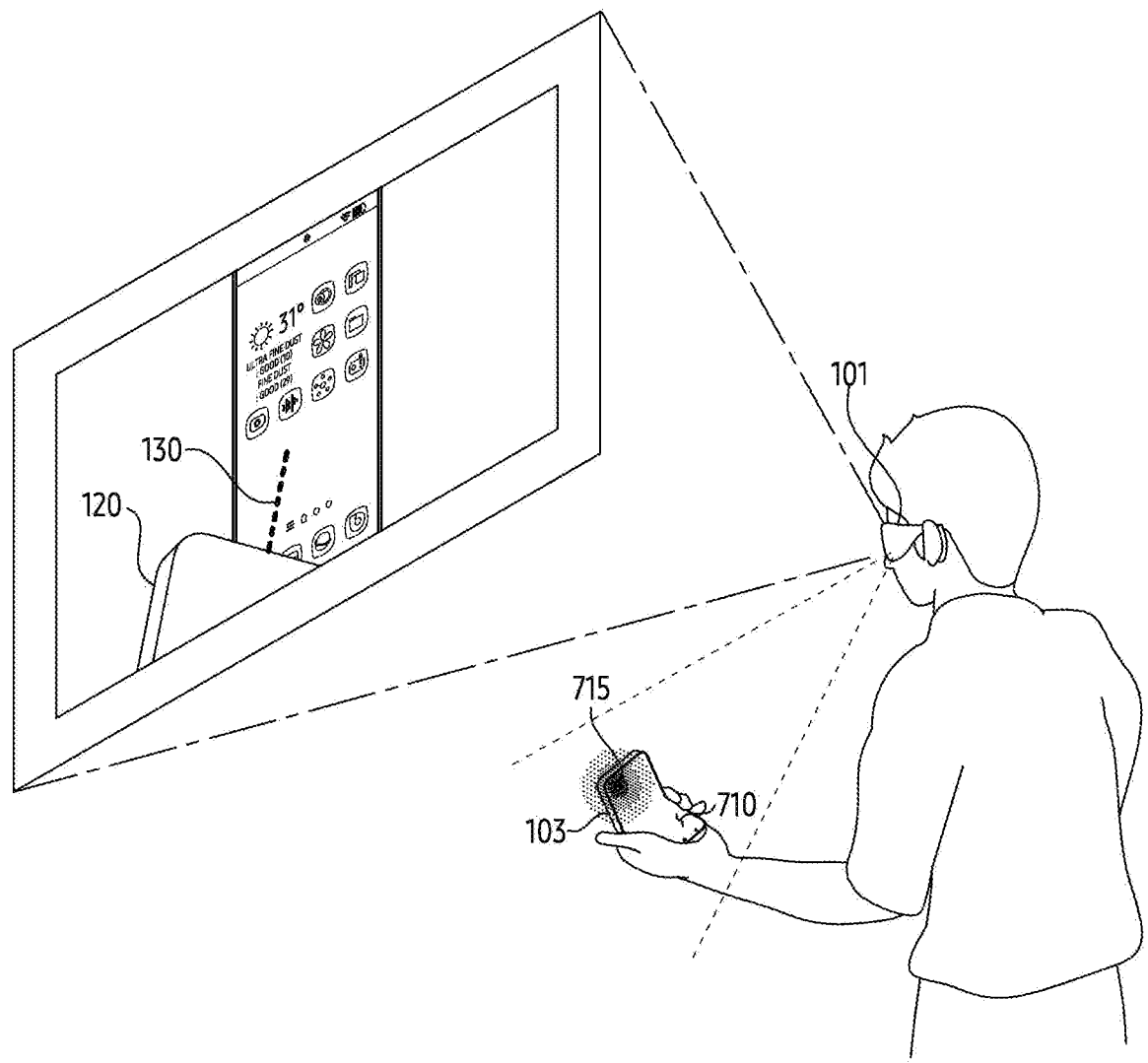
FIG. 7A is a diagram illustrating an example of a wearable device identifying an external electronic device according to an embodiment.
Figure 7B:
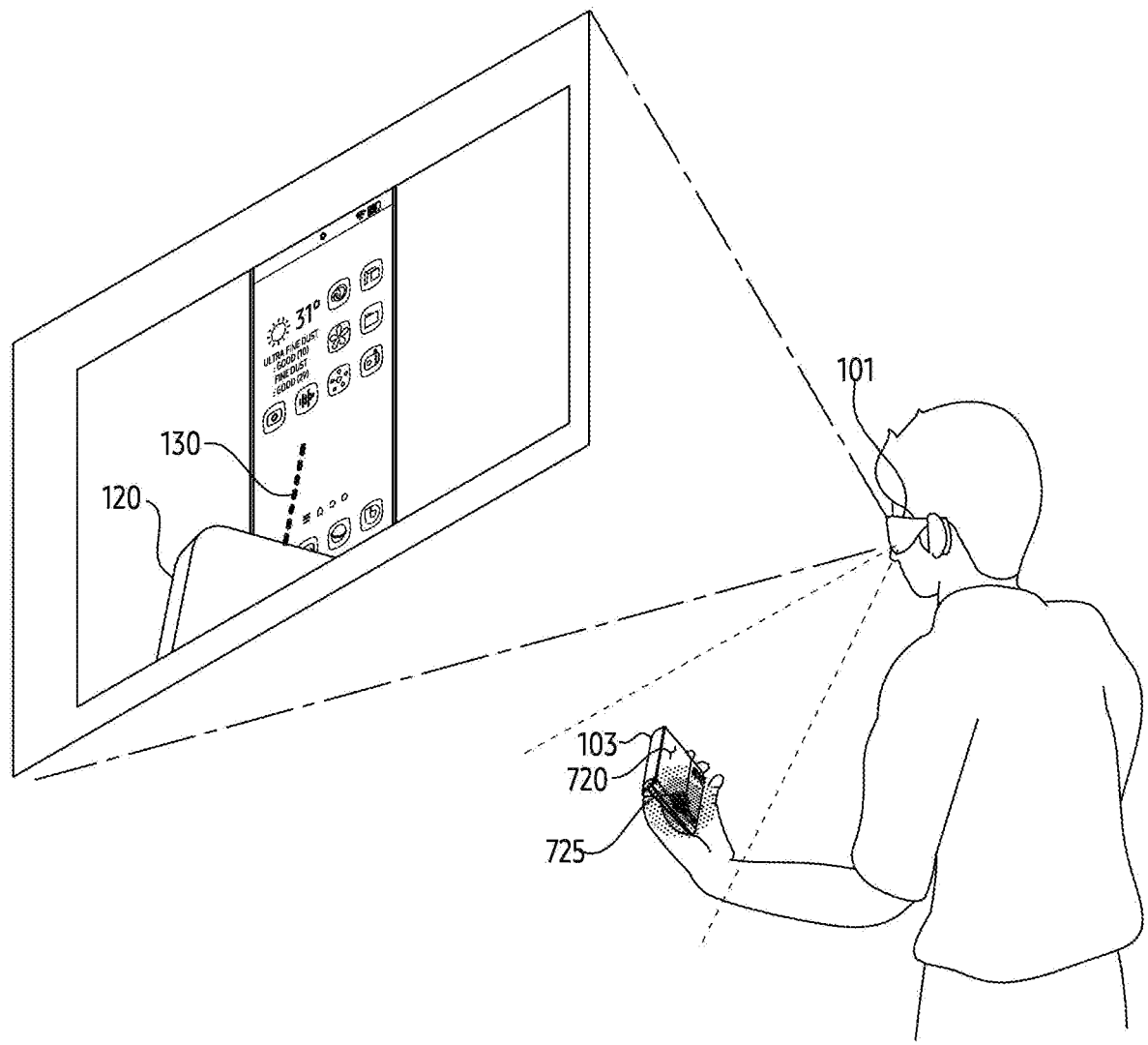
FIG. 7B is a diagram illustrating an example of a wearable device identifying an external electronic device according to an embodiment.

FIG. 7A is a diagram illustrating an example wearable device identifying an external electronic device according to an embodiment. FIG. 7B is a diagram illustrating an example of a wearable device identifying an external electronic device according to an embodiment. A wearable device 101 of FIGS. 7A and 7B may include the wearable device 101 of FIGS. 1A, 1B, 2, 5A, and/or 5B. The wearable device 101 of FIGS. 7A and 7B may include a wearable device 300 of FIGS. 3A and 3B. The wearable device 101 of FIGS. 7A and 7B may include a wearable device 400 of FIGS. 4A and 4B. The wearable device 101 of FIGS. 7A and 7B may include the wearable device of FIG. 6. Operations of FIGS. 7A and 7B may be performed by a processor 210 of FIG. 2.

Referring to FIGS. 7A and 7B, according to an embodiment, the wearable device 101 may identify an external electronic device 103 in an image output from a camera (e.g., a camera 250 of FIG. 2). The wearable device 101 can identify the motion of the external electronic device 103, based on identifying the external electronic device 103. For example, in case that the external electronic device 103 is a foldable device, the motion of the external electronic device 103 may be associated with the degree of folding. For example, the motion of the external electronic device 103 may be associated with an angle between a first housing and a second housing of the external electronic device 103. For example, the wearable device 101 may learn the motion of the external electronic device 103 based on artificial intelligence. For example, the motion of the external electronic device 103 may be obtained based on information obtained based on hardware (e.g., neural processing unit (NPU), and/or graphic processing unit (GPU)) for performing an operation associated with artificial intelligence, software for providing a function associated with the artificial intelligence, and/or an external electronic device (e.g., a server associated with the artificial intelligence). The wearable device 101 may transmit a signal for controlling an optical signal to be emitted from the external electronic device 103, based on identifying the motion of the external electronic device 103. The wearable device 101 may transmit a signal for controlling at least one of the components of the external electronic device 103, based on the motion of the external electronic device 103. For example, in FIG. 7B, the wearable device 101 may transmit a signal for controlling a flash (e.g., a flash 270 of FIG. 2) disposed on one surface 720 of the external electronic device 103, based on identifying a first preset motion of the external electronic device 103. For example, the first preset motion may be a motion in a state in which the external electronic device 103 is folded. For example, the wearable device 101 may transmit a signal for controlling a proximity sensor included in the external electronic device 103, based on identifying a second preset motion of the external electronic device 103. For example, the second preset motion may be a motion in a state in which the external electronic device 103 is unfolded. The motion of the external electronic device 103 is not limited to the above-described example. The preset motion of the external electronic device 103 may be a motion based on the angle between the first housing and the second housing of the external electronic device 103 and is not limited to those described above.

According to an embodiment, the wearable device 101 may transmit a signal for controlling a different component based on the motion of the external electronic device 103. The wearable device 101 may identify an optical signal emitted from the external electronic device 103 in response to the signal. In the example of FIG. 7A, the wearable device 101 may identify an optical signal 715 emitted from at least a portion of one surface 710 of the external electronic device 103. The wearable device 101 may display a first visual object 120 corresponding to the motion and mapped to the position of the optical signal 715, based on identifying the motion of the external electronic device 103 and the position of the optical signal 715. For example, the wearable device 101 may display the first visual object 120, based on rendering the external electronic device 103 which is the motion. The wearable device 101 may display the first visual object 120 and a second visual object 130 having a shape extended from at least a portion of the first visual object 120.

In an example illustrated in FIG. 7B, according to an embodiment, the wearable device 101 may identify a motion in which the external electronic device 103 is folded. The wearable device 101 may transmit a signal for controlling a flash disposed on one surface 720 of the external electronic device, based on identifying the folded motion of the external electronic device 103. For example, the signal for controlling the flash may be a signal for adjusting the luminous of the flash of the external electronic device 103. The wearable device 101 may identify an optical signal 725 emitted from the external electronic device 103 in response to the signal for controlling the flash. The wearable device 101 may identify a position of the external electronic device 103, based on identifying the optical signal 725. The wearable device 101 may display the first visual object 120 that renders the external electronic device 103 on a portion of the screen mapped to the position. The wearable device 101 may display the first visual object 120 and the second visual object 130 having the shape extended from the first visual object 120.

As described above, according to an embodiment, the wearable device 101 may identify the motion of the external electronic device 103. The wearable device 101 may transmit a signal for controlling at least one of the components included in the external electronic device 103, based on the motion of the external electronic device 103. The wearable device 101 may transmit a signal for controlling components that output the optical signal included in the external electronic device 103. The wearable device 101 may identify the optical signals 715 and 725 output from the external electronic device 103 in response to the signal controlling the components that output the optical signal. The wearable device 101 may display the first visual object 120, based on identifying the positions of the optical signals 715 and 725. The wearable device 101 may display the first visual object 120 in one area of the screen corresponding to the positions. The wearable device 101 may display the second visual object 130 having the shape extended from the first visual object 120. The wearable device 101 may enhance the user experience of the wearable device 101, by displaying the first visual object 120 and/or the second visual object 130, based on the position.

Figure 8:
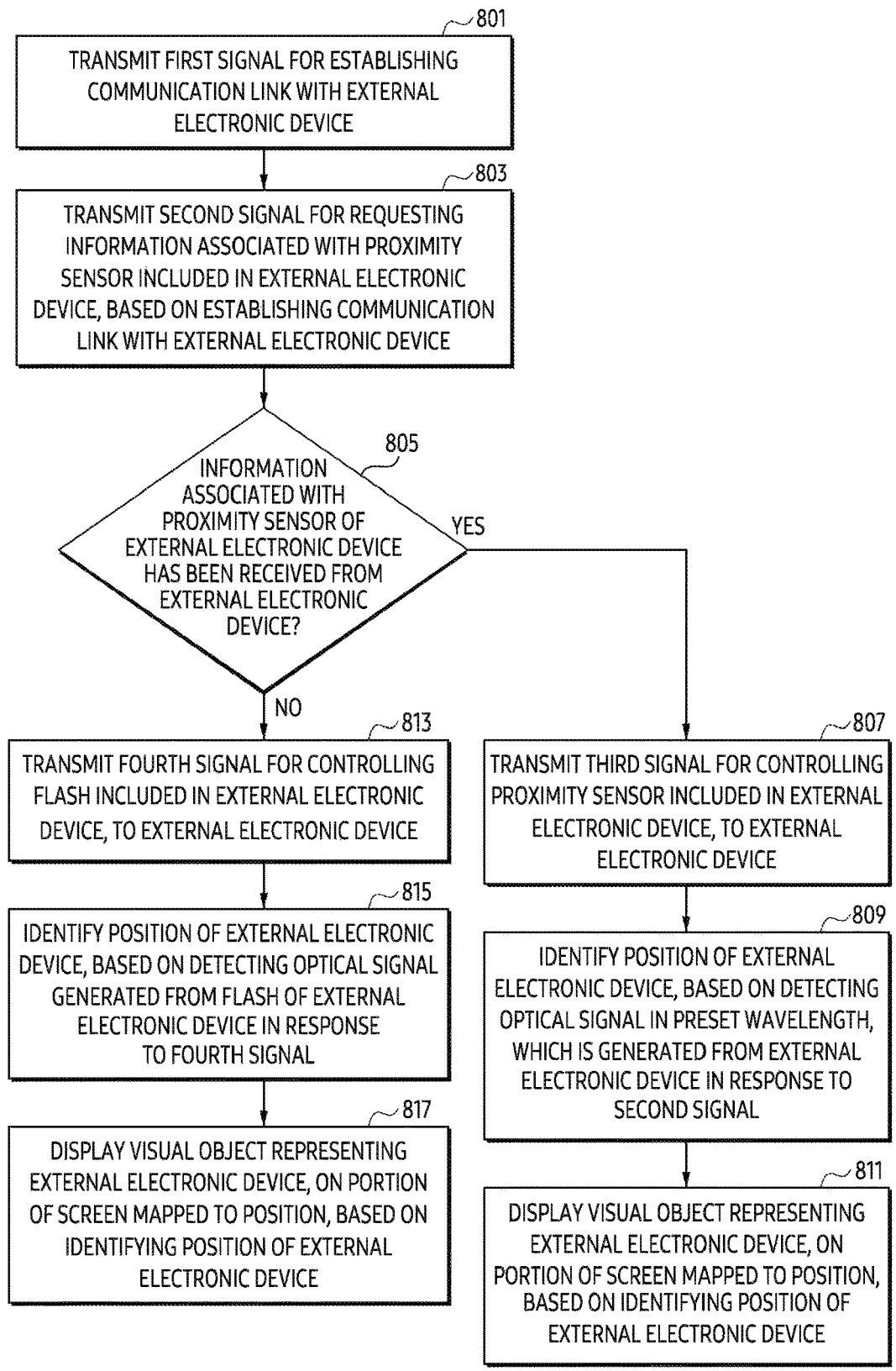
FIG. 8 is a flowchart illustrating an example operation of a wearable device according to an embodiment.

FIG. 8 is a flowchart illustrating an example operation of a wearable device according to an embodiment. The wearable device of FIG. 8 may include a wearable device 101 of FIGS. 1A, 1B, 2, 5A, 5B, 7A, and/or 7B. The wearable device of FIG. 8 may include a wearable device 300 of FIGS. 3A and 3B. The wearable device of FIG. 8 may include a wearable device 400 of FIGS. 4A and 4B. The wearable device of FIG. 8 may include the wearable device of FIG. 6. Operations of FIG. 8 may be performed by a processor 210 of FIG. 2. In the example embodiment, each operation may be performed sequentially, but is not necessarily performed sequentially. For example, the order of each operation may be changed, and at least two operations may be performed in parallel. For example, at least a portion of the operations to be described may be omitted.

Referring to FIG. 8, in operation 801, according to an embodiment, the wearable device may transmit a first signal for establishing a communication link with an external electronic device (e.g., an external electronic device 103 of FIGS. 1A, 1B, 2, 5, and/or 7). The wearable device may transmit the first signal for establishing the communication link with the external electronic device, through a communication circuit. The wearable device may establish the communication link with the external electronic device based on the external electronic device in response to the first signal.

In operation 803, according to an embodiment, the wearable device may transmit a second signal requesting information associated with a proximity sensor included in the external electronic device, based on establishing the communication link with the external electronic device. For example, the information associated with the proximity sensor may be information associated with whether the proximity sensor is included in the external electronic device.

In operation 805, according to an embodiment, the wearable device may identify whether the information associated with the proximity sensor of the external electronic device has been received from the external electronic device. For example, the wearable device may perform a different operation, based on the received information associated with the proximity sensor of the external electronic device, from the external electronic device.

In case that information associated with the proximity sensor of the external electronic device is received from the external electronic device (805—Yes), in operation 807, according to an embodiment, the wearable device may transmit a third signal for controlling the proximity sensor included in the external electronic device, to the external electronic device. For example, the third signal for controlling the proximity sensor included in the external electronic device may be a signal including information associated with the operation period of the proximity sensor.

In operation 809, according to an embodiment, the wearable device may identify an optical signal generated from the external electronic device in response to the second signal. For example, the optical signal may be generated based on an operation of the proximity sensor of the external electronic device. For example, the optical signal may include an optical signal in a preset wavelength band. For example, the optical signal in the preset wavelength band may include an optical signal in an infrared light wavelength band. The wearable device may identify a position of the external electronic device, based on identifying the optical signal in the preset wavelength band.

In operation 811, according to an embodiment, the wearable device may identify an optical signal output from the external electronic device. The wearable device may identify the position of the external electronic device, based on the optical signal. The wearable device may display a visual object representing the external electronic device, on a portion of a screen mapped to the position, based on identifying the position of the external electronic device. For example, the visual object may include a first visual object and/or a second visual object of FIGS. 1A and 1B.

In case that the information associated with the proximity sensor of the external electronic device is not received from the external electronic device (805—No), in operation 813, according to an embodiment, the wearable device may transmit a fourth signal for controlling a flash included in the external electronic device, to the external electronic device. For example, the fourth signal for controlling the flash may be a signal for adjusting the brightness of the flash of the external electronic device.

In operation 815, according to an embodiment, the wearable device may detect an optical signal generated from the flash of the external electronic device in response to the fourth signal for controlling the flash. For example, the wearable device may identify the position of the external electronic device, based on detecting the optical signal output from the flash. For example, the wearable device may identify an external electronic device positioned in an area including the position of the optical signal, based on identifying the position of the optical signal.

In operation 817, according to an embodiment, the wearable device may display the visual object representing the external electronic device, on a portion of the screen mapped to the position, based on identifying the position of the external electronic device. For example, the visual object may include a first visual object 120 and/or a second visual object 130 of FIG. 1A and/or FIG. 1B.

As described above, according to an embodiment, the wearable device may transmit a signal for controlling at least one of the components of the external electronic device, based on the information associated with the proximity sensor transmitted from the external electronic device. The wearable device may perform a different operation, based on the information associated with the proximity sensor transmitted from the external electronic device. The wearable device may identify the position of the optical signal output from the proximity sensor of the external electronic device and/or the optical signal output from the flash. The wearable device may display the visual object based on the position. The wearable device may enhance the user experience of the wearable device, by displaying the visual object based on the position.

Figure 9:
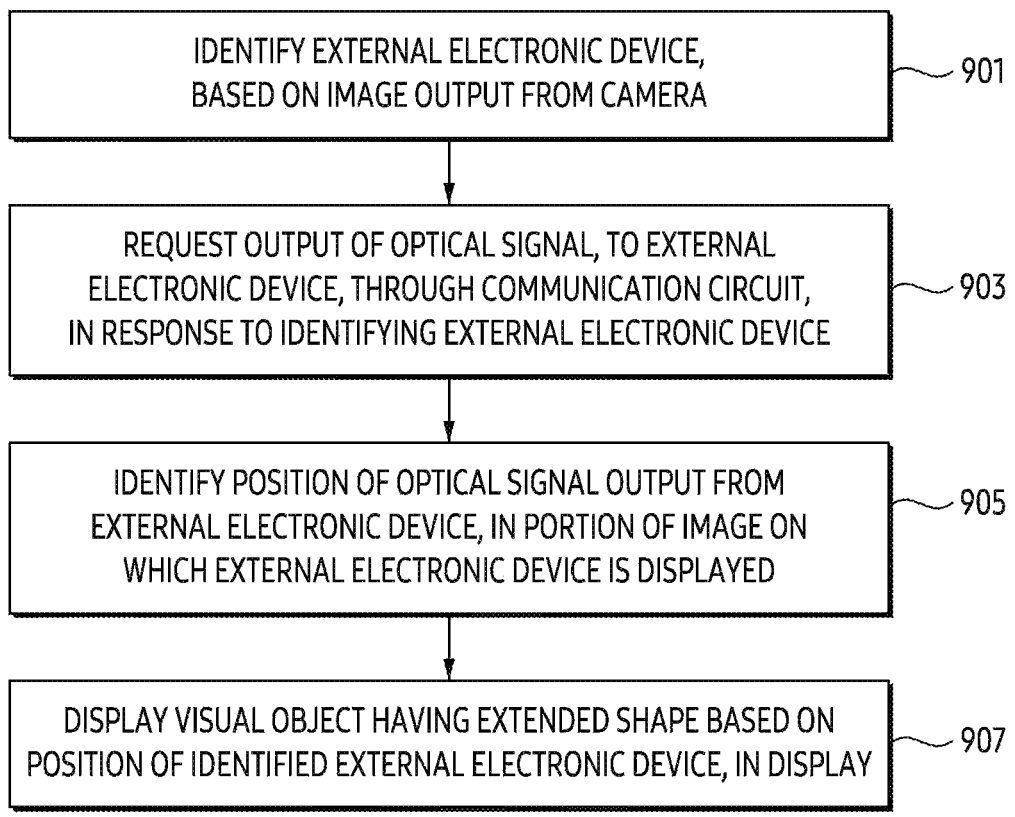
FIG. 9 is a flowchart illustrating an example operation of a wearable device according to an embodiment.

FIG. 9 is a flowchart illustrating an example operation of a wearable device according to an embodiment. The wearable device of FIG. 9 may include a wearable device 101 of FIGS. 1A, 1B, 2, 5A, 5B, 7A, and/or 7B. The wearable device of FIG. 9 may include a wearable device 300 of FIGS. 3A and 3B. The wearable device of FIG. 9 may include a wearable device 400 of FIGS. 4A and 4B. The wearable device of FIG. 9 may include the wearable device of FIGS. 6 and/or 8. Operations of FIG. 9 may be performed by a processor 210 of FIG. 2. In the example embodiment, each operation may be performed sequentially, but is not necessarily performed sequentially. For example, the order of each operation may be changed, and at least two operations may be performed in parallel. For example, at least a portion of the operations to be described may be omitted.

Referring to FIG. 9, in operation 901, according to an embodiment, the wearable device may identify an external electronic device, based on an image output from a camera (e.g., a camera 250 of FIG. 2). For example, the wearable device may identify an external electronic device included in a partial area of the image. The wearable device may identify the partial area in the image, including the external electronic device.

In operation 905, according to an embodiment, the wearable device may request the output of an optical signal (e.g., an optical signal 110 of FIG. 1), to the external electronic device through a communication circuit (e.g., a communication circuit 230 of FIG. 2), in response to identifying the external electronic device. For example, the optical signal may include an optical signal output from an external electronic device in response to the request. For example, the wearable device may transmit a first signal for requesting an output of the optical signal to the external electronic device. The wearable device may output the optical signal in response to the first signal. For example, the request may include a signal requesting activation of a proximity sensor included in the external electronic device. For example, the request may include a signal requesting activation of a flash included in the external electronic device.

In operation 905, according to an embodiment, the wearable device may identify a position of the optical signal output from the external electronic device, in a portion of the image on which the external electronic device is displayed. For example, the wearable device may identify the optical signal in the partial area in the image corresponding to the external electronic device. The wearable device may identify the position of the optical signal, in response to identifying the optical signal. The wearable device may identify the position of the optical signal based on a light source emitting the optical signal.

In operation 907, according to an embodiment, the wearable device may display a visual object having an extended shape based on the position of the identified external electronic device, in a display (e.g., a display 240 of FIG. 2). For example, the wearable device may display a first visual object (e.g., a first visual object 120 of FIGS. 1A and/or 1B) that renders the external electronic device. For example, the wearable device may display a second visual object (e.g., a second visual object 130 of FIGS. 1A and/or 1B) having a shape extended from the first visual object.

As described above, according to an example embodiment, the wearable device may identify the external electronic device and the optical signal output from the external electronic device in the image. The wearable device may identify the position of the external electronic device, based on the position of the optical signal output from the external electronic device. The wearable device may display the visual object having the extended shape based on the position of the optical signal. The wearable device may enhance the user experience of the wearable device, by displaying the visual object based on the position.

Metaverse may refer, for example, to a combination of the English words Meta, which may refer to "virtual" and "transcendence," and "Universe," which may refer to the universe, and may refer to a three-dimensional virtual world where social, economic, and cultural activities like the real world take place. Metaverse is a concept that has evolved one step further than virtual reality, and it is characterized using, for example, avatars to not only enjoy games or virtual reality (VR, cutting-edge technology that enables people to experience real-life experiences in a computerized virtual world), but also social and cultural activities like real reality. Metaverse service may provide media content to enhance immersion in the virtual world, based on augmented reality (AR), virtual reality environment (VR), mixed environment (MR), and/or extended reality (XR).

For example, the media content provided by metaverse service may include social interaction content including a game, a concert, a party, and/or a conference based on an avatar. For example, the media content may include information for economic activities such as advertising, user-created content, and/or sales of products and/or shopping. Ownership of the user-created content may be proved by a blockchain-based non-fungible token (NFT). The metaverse service may support economic activities based on real money and/or cryptocurrency. Virtual content linked to the real world, such as digital twin or life logging, may be provided by the metaverse service.

Figure 10:
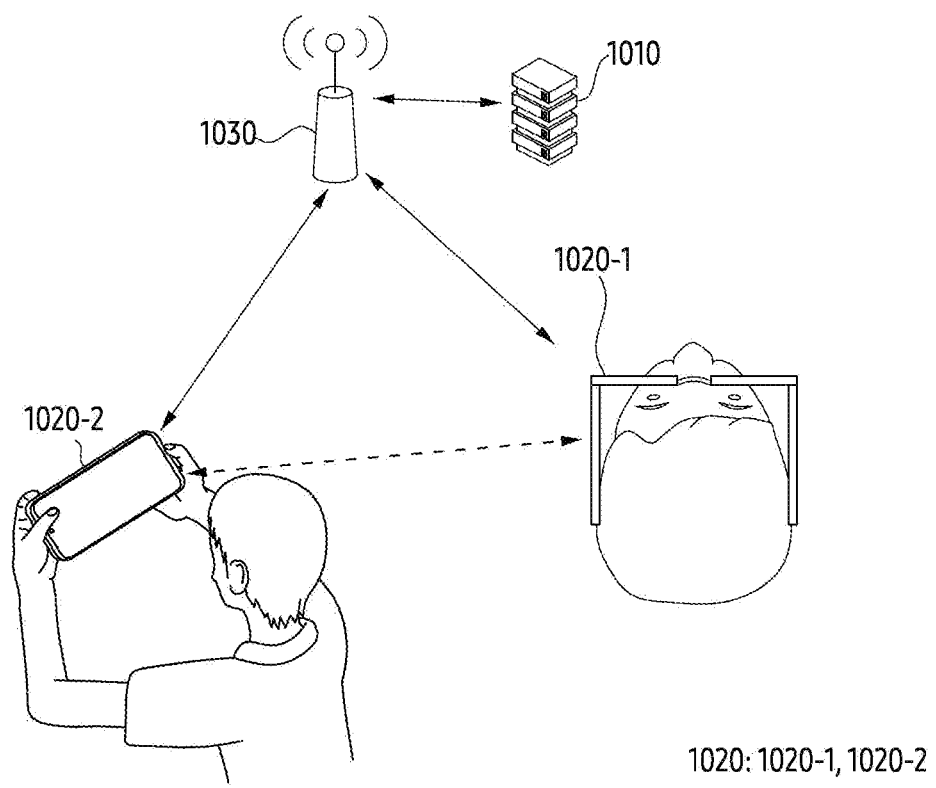
FIG. 10 is a diagram illustrating an example network environment associated with a metaverse service according to an embodiment.

FIG. 10 is a diagram illustrating an example network environment 1001 that receives a metaverse service through a server 1010 according to an embodiment.

Referring to FIG. 10, the network environment 1001 may include a server 1010, a user terminal 1020 (e.g., a first terminal 1020-1 and a second terminal 1020-2), and a network connecting the server 1010 and the user terminal 1020. In the network environment 1001, the server 1010 may provide a metaverse service to the user terminal 1020. The network may be formed by at least one intermediate node 1030 including an access point (AP) and/or a base station. The user terminal 1020 may access the server 1020 through a network and output a user interface (UI) associated with the metaverse service to the user of the user terminal 1020. Based on the UI, the user terminal 1020 may obtain information to be inputted into the metaverse service from the user or output information associated with the metaverse service (e.g., multimedia content) to the user.

In this case, the server 1010 provides a virtual space so that the user terminal 1020 may perform activities in the virtual space. In addition, the user terminal 1020 may represent information provided by the server 1010 to the user or transmit information in which the user wants to represent in the virtual space to the server, by installing S/W agent to access a virtual space provided by the server 1010. The S/W agent may be provided directly through the server 1010, downloaded from a public server, or embedded and provided when purchasing a terminal.

In an embodiment, the metaverse service may be provided to the user terminal 1020 and/or the user using the server 1010. The embodiment is not limited thereto, and the metaverse service may be provided through individual contact between users. For example, within the network environment 1001, the metaverse service may be provided by a direct connection between the first terminal 1020-1 and the second terminal 1020-2, independently of the server 1010. Referring to FIG. 10, in the network environment 1001, the first terminal 1020-1 and the second terminal 1020-2 may be connected to each other through a network formed by at least one intermediate node 1030. In an embodiment where the first terminal 1020-1 and the second terminal 1020-2 are directly connected, any one user terminal of the first terminal 1020-1 and the second terminal 1020-2 may serve as the server 1010. For example, a metaverse environment may be configured only with a device-to-device connection (e.g., a peer-to-peer (P2P) connection).

In an embodiment, the user terminal 1020 (or the user terminal 1020 including the first terminal 1020-1 and the second terminal 1020-2) may be made into various form factors, and may be characterized by including an input device for inputting information to the metaverse service and an output device that provides video and/or sound to the user. Examples of various form factors of the user terminal 1020 include a smartphone (e.g., the second terminal 1020-2), an AR device (e.g., the first terminal 1020-1), a VR device, an MR device, a video see through (VST) device, an optical see through (OST) device, a smart lens, a smart mirror, a TV or a projector capable of input/output.

The network (e.g., a network formed by at least one intermediate node 1030) may include various broadband networks including 3G, 4G, and 5G, a short-range networks including Wi-fi and BT (e.g., a wired network or a wireless network that directly connect the first terminal 1020-1 and the second terminal 1020-2).

In an embodiment, the user terminal 1010 of FIG. 10 may include the wearable device 101 of FIGS. 1A to 10 and/or the external device.

A method for displaying a visual object mapped to a position of the external electronic device identified by the wearable device may be required.

As described above, according to an example embodiment, a wearable device may comprise: a camera, a display, a communication circuit, and a processor. The processor may be configured to identify, based on an image output from the camera, an external electronic device. The processor, based on the identification, may be configured to request outputting of an optical signal to the external electronic device through the communication circuit. The processor 210 may be configured to identify, in a portion of the image where the external electronic device is displayed, a position of the optical signal output from the external electronic device. The processor may be configured to control the display to display a visual object having an extended shape based on the identified position in the display.

According to an example embodiment, a wearable device may comprise a sensor. The processor may be configured to detect the optical signal of a specified wavelength band using the sensor.

According to an example embodiment, the optical signal may be outputted from the external electronic device based on activation of a proximity sensor included in the external electronic device in response to the request.

According to an example embodiment, the processor may be configured to change, in response to receiving data obtained based on a sensor of the external electronic device from the external electronic device, a representation of the visual object based on rendering of the visual object.

According to an example embodiment, the processor may, based on receiving information associated with motion of the external electronic device from the external electronic device 103, be configured to control the communication circuit to transmit a fourth signal for controlling a flash of the external electronic device or a proximity sensor of the external electronic device.

According to an example embodiment, the processor may be configured to render, based on identifying the position of the optical signal using the camera, the external electronic device. The processor may be configured to control the display to display the visual object extended from the rendered external electronic device.

According to an example embodiment, the wearable device may comprise a communication circuit. The processor may be configured to transmit a fifth signal for requesting establishing communication link to the external electronic device through the communication circuit.

According to an example embodiment, the processor may be configured to identify, based on identifying motion of the external electronic device using the camera, the position.

As described above, according to an example embodiment, a method of a wearable device, may comprise identifying, based on an image output from a camera, an external electronic device. The method may comprise, based on the identification, requesting outputting of an optical signal to the external electronic device through the communication circuit. The method may comprise identifying, in a portion of the image where the external electronic device is displayed, a position of the optical signal output from the external electronic device. The method may comprise displaying a visual object having an extended shape based on the identified position in the display.

According to an example embodiment, the identifying may comprise detecting the optical signal of a specified wavelength band using the sensor.

The optical signal may be output from the external electronic device based on activation of a proximity sensor included in the external electronic device in response to the request.

According to an example embodiment, the displaying may comprise changing, in response to receiving data obtained based on a sensor of the external electronic device from the external electronic device, a representation of the visual object based on rendering of the visual object.

According to an example embodiment, the requesting may comprise, based on receiving information associated with motion of the external electronic device from the external electronic device, transmitting a fourth signal for controlling a flash of the external electronic device or a proximity sensor of the external electronic device.

According to an example embodiment, the displaying may comprise rendering, based on identifying the position of the optical signal using the camera, the external electronic device. The method may comprise displaying the visual object extended from the rendered external electronic device.

According to an example embodiment, the requesting may comprise transmitting a fifth signal for requesting establishing communication link to the external electronic device through the communication circuit.

According to an example embodiment, the identifying may comprise identifying, based on identifying motion of the external electronic device using the camera, the position.

As described above, according to an example embodiment, a non-transitory computer-readable storage medium may store one or more programs, wherein the one or more programs, when executed by a processor of a wearable device, may cause the wearable device to identify, based on an image output from the camera, an external electronic device. The one or more programs, when executed by the processor of the wearable device, based on the identification, may cause the wearable device to request outputting of an optical signal to the external electronic device through the communication circuit. The one or more programs, when executed by the processor of the wearable device, may cause the wearable device to identify, in a portion of the image where the external electronic device is displayed, a position of the optical signal output from the external electronic device. The one or more programs, when executed by the processor of the wearable device, may cause the wearable device to display a visual object having an extended shape based on the identified position in the display.

According to an example embodiment, the one or more programs, when executed by the processor of the wearable device, may cause the wearable device to detect the optical signal of a specified wavelength band using a sensor.

According to an example embodiment, the optical signal may be output from the external electronic device based on activation of a proximity sensor included in the external electronic device in response to the request.

According to an example embodiment, the one or more programs, when executed by the processor of the wearable device 101 may cause the wearable device to change, in response to receiving data obtained based on a sensor of the external electronic device from the external electronic device, a representation of the visual object based on rendering of the visual object.

According to an example embodiment, the one or more programs, when executed by the processor of the wearable device, based on receiving information associated with motion of the external electronic device from the external electronic device, may cause the wearable device to transmit a fourth signal for controlling a flash of the external electronic device or a proximity sensor of the external electronic device.

According to an example embodiment, the one or more programs, when executed by the processor of the wearable device, may cause the wearable device to render, based on identifying the position of the optical signal using the camera, the external electronic device. The one or more programs, when executed by the processor of the wearable device, may cause the wearable device to display the visual object extended from the rendered external electronic device.

According to an example embodiment, the one or more programs, when executed by the processor of the wearable device, may cause the wearable device to transmit a fifth signal for requesting establishing communication link to the external electronic device through the communication circuit.

According to an example embodiment, the one or more programs, when executed by the processor of the wearable device, may cause the wearable device to identify, based on identifying motion of the external electronic device using the camera, the position.

The electronic device according to various embodiments disclosed in the present disclosure may be various types of devices. The electronic device may include, for example, a portable communication device (e.g., a smartphone), a computer device, a portable multimedia device, a portable medical device, a camera, an electronic device, a home appliance, or the like. The electronic device according to an embodiment of the present disclosure is not limited to the above-described devices.

The various embodiments of the present disclosure and terms used herein are not intended to limit the technical features described in the present disclosure to specific embodiments and should be understood to include various modifications, equivalents, or substitutes of the embodiment. In relation to the description of the drawings, a similar reference numeral may be used for a similar or related component. The singular form of a noun corresponding to an item may include the one item or a plurality of items, unless clearly indicated differently in a related context. In the present disclosure, each of the phrases such as "A or B", "at least one of A and B", "at least one of A or B", "A, B or C", "at least one of A, B and C", and "at least one of A, B, or C" may include any one of the items listed together in the corresponding one of the phrases, or all possible combinations thereof. Terms such as "1st", "2nd", or "the first", or "the second" may be used simply to distinguish a corresponding component from another corresponding component and does not limit the components to another aspect (e.g., importance or order). In case that certain (e.g., 1st) component is referred to as "coupled" or "connected" in another (e.g., 2nd) component, with or without the term "functional" or "communicatively", the certain components may be connected to the other component directly (e.g., by wiredly), wirelessly, or through a third component.

The term "module" used in various embodiments of the present disclosure may include a unit implemented in hardware, software, or firmware, or any combination thereof, and may be used interchangeably with terms such as logic, logic block, component, or circuit, for example. The module may be a single integral component, or a minimal unit of the component or a portion thereof that performs one or more functions. For example, according to an embodiment, the module may be implemented in the form of an application-specific integrated circuit (ASIC).

Various embodiments of the present disclosure may be implemented as software (e.g., a program) including one or more instructions stored in a storage medium (e.g., memory 220) readable by a machine (e.g., wearable device 101). For example, a processor (e.g., a processor 210) of the machine (e.g., the wearable device 100) may call at least one command among the one or more instructions stored from the storage medium and may execute it. This makes it possible for the machine to be operated to perform at least one function according to the at least one instruction called. The one or more instructions may include code generated by a compiler or code that may be executed by an interpreter. The machine-readable storage medium may be provided in the form of a non-transitory storage medium. Here, the 'non-transitory' storage medium is a tangible device and may not include a signal (e.g., electromagnetic wave), and the term does not distinguish between a case where data is semi-permanently stored and a case where it is temporarily stored.

According to an embodiment, a method according to various embodiments disclosed in the present disclosure may be provided by being included in a computer program product. The computer program product may be traded between sellers and buyers as a product. The computer program product may be distributed in the form of machine-readable storage medium (e.g., compact disc read only memory (CD-ROM), or may be distributed (e.g., downloaded or uploaded) online, directly through an application store (e.g., Play Store™) or between two user devices (e.g., smartphones). In the case of online distribution, at least a portion of the computer program product may be at least temporarily stored in the machine-readable storage medium such as a server of a manufacturer, a server of the application store, or a memory of a relay server, or may be temporarily created.

According to various embodiments, each component (e.g., module or program) of the above-described components may include a singular or a plurality of objects, and some of the plurality of objects may be separately disposed in another component. According to various embodiments, one or more components or operations among the above-described corresponding components may be omitted, or one or more other components or operations may be added. Alternatively, or additionally, a plurality of components (e.g., modules or programs) may be integrated into one component. In this case, the integrated component may perform one or more functions of a component of each of the plurality of components in the same or similar manner as those performed by the corresponding component among the plurality of components before the integration. According to various embodiments, operations performed by the module, the program, or the other component may be executed sequentially, in parallel, repeatedly, or heuristically, one or more of the operations may be executed in a different order, may be omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from full scope of the disclosure, including the appended claims and their equivalents. It will also be understood that any of the embodiment(s) described herein may be used in conjunction with any other embodiment(s) described herein.

What is claimed is:

1. A wearable device, comprising:
   a camera;
   communication circuitry;
   a display;
   at least one processor comprising processing circuitry; and
   memory comprising one or more storage media storing instructions, when executed individually and/or collectively by the at least one processor, cause the wearable device to:
   identify, based on an image obtained from the camera, an external electronic device;
   identify a state of the external electronic device among a first state in which a first light emitting component disposed on a first side of the external electronic device is exposed to the wearable device and a second state in which a second light emitting component disposed on a second side of the external electronic device, opposite to the first side of the external electronic device, is exposed to the wearable device;
   based on the state of the external electronic device being the first state:
      transmit, to the external electronic device, a first signal for activating the first light emitting component, and
      in response to identifying a position of a first optical signal output from the first the light emitting component, display a first visual object representing the external electronic device, and a second visual object extending from the first visual object to indicate a direction according to an orientation of the external electronic device; and based on the state of the external electronic device being the second state, transmit, to the external electronic device, a second signal for activating the second light emitting component, and in response to identifying a position of a second optical signal output from the second light emitting component, display a third visual object representing the external electronic device, and a fourth visual object extending from the third visual object to indicate the direction according to the orientation of the external electronic device.

2. A wearable device of claim 1, further comprising a sensor;

wherein a wavelength band of the first optical signal is different from a wavelength band of the second optical signal;

wherein the first optical signal is identified using the sensor; and wherein the second optical signal is identified using the camera.

3. The wearable device of claim 1, wherein the external electronic device is a foldable device; and wherein the instructions, when executed by the at least one processor, cause the wearable device to:

receive, via the communication circuitry, state information associated a form of the external electronic device; and identify, based on the state information, the state of the external electronic device.

4. The wearable device of claim 3, comprising a first housing and a second housing;

wherein the state information includes information on whether the external electronic device is folded, and information on an angle between the first housing and the second housing.

5. The wearable device of claim 4, wherein the instructions, when executed by the at least one processor individually or collectively, cause the wearable device to:

based on identifying the external electronic device being folded, identify the state of the external electronic device being the first state; and based on identifying the external electronic device being unfolded, identify the state of the external electronic device being the second state.

6. The wearable device of claim 3, wherein the first visual object and the third visual object are obtained based on the state information.

7. The wearable device of claim 1, wherein the instructions, when executed individually and/or collectively by the at least one processor, cause the wearable device to:

receive, from the external electronic device, motion data representing a motion of the external electronic device; and change, based on the motion data, a representation of one of a first virtual object and a second virtual object, wherein the first virtual object includes the first visual object and the second visual object, and wherein the second virtual object includes the third visual object and the fourth visual object.

8. The wearable device of claim 1, wherein the second visual object is obtained based on the first visual object, and wherein the fourth visual object is obtained based on the third visual object.

9. A method executed by a wearable device, comprising:

identifying, based on an image obtained from a camera, an external electronic device;

identifying a state of the external electronic device among a first state in which a first light emitting component disposed on a first side of the external electronic device is exposed to the wearable device and a second state in which a second light emitting component disposed on a second side of the external electronic device, opposite to the first side of the external electronic device, is exposed to the wearable device;

based on the state of the external electronic device being the first state:

transmitting, to the external electronic device, a first signal for activating the first light emitting component, and in response to identifying a position of a first optical signal output from the first the light emitting component, displaying a first visual object representing the external electronic device, and a second visual object extending from the first visual object to indicate a direction according to an orientation of the external electronic device; and based on the state of the external electronic device being the second state, transmitting, to the external electronic device, a second signal for activating the second light emitting component, and in response to identifying a position of a second optical signal output from the second light emitting component, displaying a third visual object representing the external electronic device, and a fourth visual object extending from the third visual object to indicate the direction according to the orientation of the external electronic device.

10. The method of claim 9, wherein a wavelength band of the first optical signal is different from a wavelength band of the second optical signal;

wherein the first optical signal is identified using the sensor; and wherein the second optical signal is identified using the camera.

11. The method of claim 9, wherein the external electronic device is a foldable device; and wherein the method comprises:

receiving, via the communication circuitry, state information associated a form of the external electronic device; and identifying, based on the state information, the state of the external electronic device.

12. The method of claim 11, wherein the state information includes information on whether the external electronic device is folded, information on an angle between the first housing and the second housing.

13. The method of claim 12, comprising:

based on identifying the external electronic device being folded, identifying the state of the external electronic device being the first state; and based on identifying the external electronic device being unfolded, identifying the state of the external electronic device being the second state.

14. The method of claim 11, wherein the first visual object and the third visual object are obtained based on the state information.

15. The method of claim 9, comprising:
receiving, from the external electronic device, motion data representing a motion of the external electronic device; and
changing, based on the motion data, a representation of one of a first virtual object and a second virtual object,
wherein the first virtual object includes the first visual object and the second visual object, and
wherein the second virtual object includes the third visual object and the fourth visual object.

16. The method of claim 9, wherein the second visual object is obtained based on the first visual object, and
wherein the fourth visual object is obtained based on the third visual object.

17. A non-transitory computer readable storage medium storing one or more programs, wherein the one or more programs include instructions which, when executed individually and/or collectively by at least one processor of a wearable device with a camera, communication circuitry, and a display, cause the wearable device to:
identify, based on an image obtained from the camera, an external electronic device;
identify a state of the external electronic device among a first state in which a first light emitting component disposed on a first side of the external electronic device is exposed to the wearable device and a second state in which a second light emitting component disposed on a second side of the external electronic device, opposite to the first side of the external electronic device, is exposed to the wearable device;
based on the state of the external electronic device being the first state:
transmit, to the external electronic device, a first signal for activating the first light emitting component, and
in response to identifying a position of a first optical signal output from the first the light emitting component, display a first visual object representing the external electronic device, and a second visual object extending from the first visual object to indicate a direction according to an orientation of the external electronic device; and
based on the state of the external electronic device being the second state,
transmit, to the external electronic device, a second signal for activating the second light emitting component, and
in response to identifying a position of a second optical signal output from the second light emitting component, display a third visual object representing the external electronic device, and a fourth visual object extending from the third visual object to indicate the direction according to the orientation of the external electronic device.

18. The non-transitory computer readable storage medium of claim 17, wherein the one or more programs, wherein the wearable device comprises a sensor,
and wherein the one or more programs include the instructions which, when executed by the at least one processor, cause the wearable device to:
wherein the first optical signal is identified using the sensor; and
wherein the second optical signal is identified using the camera.

19. The non-transitory computer readable storage medium of claim 17, wherein the external electronic device is a foldable device; and
wherein the one or more programs include the instructions which, when executed by the at least one processor, cause the wearable device to:
receive, via the communication circuitry, state information associated a form of the external electronic device; and
identify, based on the state information, the state of the external electronic device.

20. The non-transitory computer readable storage medium of claim 17, wherein the wearable device comprises a first housing and a second housing; and
wherein the state information includes information on whether the external electronic device is folded, information on an angle between the first housing and the second housing.

* * * * *